United States Patent [19]

Workman

[11] 4,136,258
[45] Jan. 23, 1979

[54] TRANSITION ENCODING APPARATUS
[75] Inventor: Harold W. Workman, Cedar Rapids, Iowa
[73] Assignee: Rockwell International Corporation, El Segundo, Calif.
[21] Appl. No.: 814,607
[22] Filed: Jul. 11, 1977
[51] Int. Cl.² ............................................ H03K 13/00
[52] U.S. Cl. .................................. 178/68; 325/38 R; 340/146.1 A
[58] Field of Search .......................... 178/68, 69.1, 88; 325/38 R, 38 A, 41, 42; 340/146.1 A, 146.1 AB

[56] References Cited
U.S. PATENT DOCUMENTS

| | | | |
|---|---|---|---|
| 3,394,312 | 7/1968 | Pfeiffer | 325/38 R |
| 3,546,594 | 12/1970 | Meile | 325/363 |
| 3,819,853 | 6/1974 | Stein | 178/68 |
| 4,003,042 | 1/1977 | Van Duuren | 340/347 DD |
| 4,007,421 | 2/1977 | Lien | 325/38 R |

Primary Examiner—Benedict V. Safourek
Assistant Examiner—Michael A. Masinick
Attorney, Agent, or Firm—Bruce C. Lutz

[57] ABSTRACT

Apparatus for encoding isochronous data into a digital format wherein the output encoded word represents a digital number indicative of the time between a frame pulse and the first transition of incoming data, provides a logic level bit indicative of the data logic level immediately after the first transition and also provides a further logic bit, comprising part of the output word, which is indicative of the logic level at the end of the frame period. The present invention is restricted to isochronous data which has a bit period of no less than half of the framing period.

9 Claims, 22 Drawing Figures

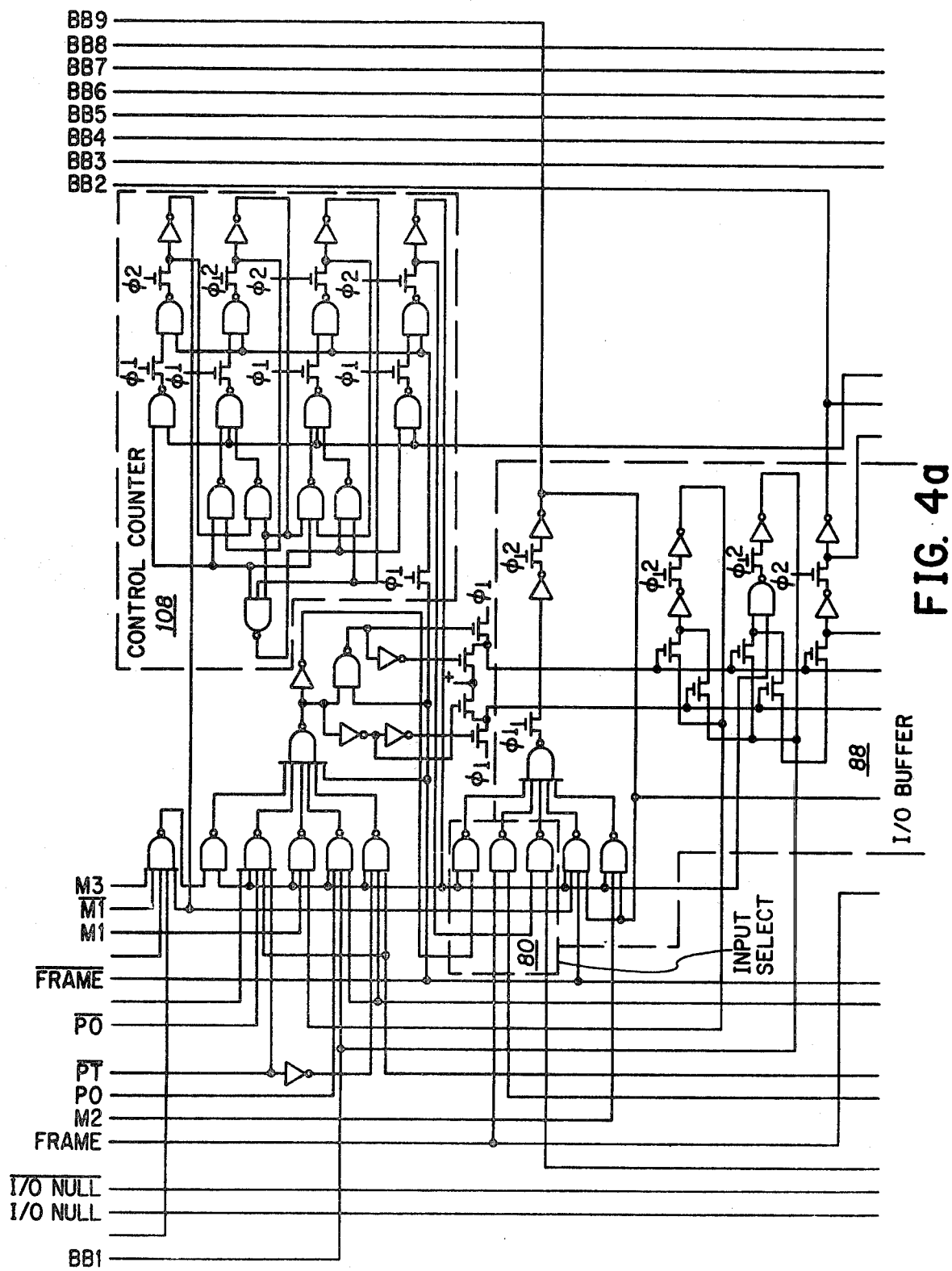

TRANSITION ENCODING APPARATUS

THE INVENTION

The present invention is generally directed to electronics and more specifically to a system for both encoding and decoding information based upon transitions of incoming data with respect to an internally generated set of framing pulses.

Transition encoding is a general method of encoding binary data from an isochronous data source so that it can be transmitted over data carrier and then decoded into its original form at the destination. (Note: Isochronous data is defined as occurring in a data stream having fixed length data bits occurring in groups of bits although the time between groups may and usually does vary.) Prior art encoding techniques have used the fact that a binary data stream consists of only two values, logic 1 and logic 0, so that the source data can be encoded by inscribing only the time that each source data transition occurs. Two transitions are possible, from logic 1 to logic 0, and from logic 0 to logic 1. The encoded word which is transmitted contains a binary number indicative of the time from a transition to an internally generated framing pulse and additionally contains an indication of the value of the incoming data either before or after the transition. If there is no transition, the binary indication is indicative of the full time between framing pulses and the logic level indication is merely that occurring during the entire frame time. At the destination, the source data is decoded from the carrier channel by a reverse process. Each received code word is decoded to establish a delay value which is measured from the corresponding framing pulse to a transition and then is reproduced into destination data.

Transition encoding has been used because it provides good efficiency (the inverse of the number of carrier channel bits required to describe one source channel bit) while providing low quantizing distortion (the maximum timing error in reproducing a transition at the destination divided by the length of the source bit).

The present invention improves upon the efficiency by providing a greater efficiency for the same distortion than previously developed transition encoding schemes. The source data is limited to that where the transitions are spaced at multiples of the unit interval in the data source or that the transitions be spaced at undefined intervals where these undefined intervals must be greater than the distance between framing pulses or one carrier code word (this last property is an anisochronous property).

The present invention obtains its greater efficiency by adding a second bit to each code word to describe a second transition within a carrier channel timing mark or frame pulse, if any transition should occur. While this increases the length of each code word by one bit, it allows nearly a factor of 2 increase in the efficiency because two source data transitions are now possible within each framing pulse instead of only one. (No other known transition encoding scheme allows two source data transitions within one cord word.)

The method of encoding, as implied above, is to measure the time duration or lapse between the first transition after a framing pulse to a given framing pulse and insert its binary value into the first M bit positions of the code word. This measurement may either be from the framing pulse to the transition or from the transition to the next framing pulse. A further bit position of the code word is loaded with the value of the source channel after the transition and a final bit position is loaded with the value of the source channel at the end of the frame time. If no transition occurs within the frame, the value loaded is indicative of the time between framing pulses.

To decode at the destination, a locally generated frame pulse having the same frequency as that at the transmitter is derived from the incoming data and is used to reproduce the first transition during a code word and since the time between the first and second transition is known (an isochronous property) the decoder reproduces the second transition by measuring a fixed delay from the first transition.

The efficiency of the method described as prior art would be $1/(N+1)$ while the efficiency of the present method is $2/M+2)$. The maximum distortion of the method described as prior art would be $1/2^N$ while the maximum distortion of the present method is $2/2^M$. If the distortions of the two methods are equal, then $M-1=N$. Under these conditions, the efficiency of the present method is $2/(N+3)$, which is $\geq$ the efficiency of the prior art method, where M is the number of bits used to describe time difference between a sample pulse and a frame pulse in the present invention, and N is indicative of the same quantity in prior art approaches.

While the present method is limited to source data processing isochronous or anisochronous properties, it is believed that the greater efficiency overcomes this minor limitation.

It is an object of the present invention to increase the efficiency of transmission of source data over digital transmission lines using transition encoding.

Other objects and advantages of the present invention will be apparent from a reading of the specification and appended claims in conjunction with the drawings wherein:

FIGS. 1A-1D comprise a set of detailed schematic diagrams illustrating the clock signal generator portion of a specific embodiment of the invention, the block diagram of which is shown in FIG. 6;

FIGS. 2A-2F provide detailed schematic diagrams of the decoder section of the above invention wherein the decoder section is shown in block diagram form in FIG. 9;

FIGS. 3A-3D provide detailed schematic diagrams of the encoder section of one embodiment of the present invention wherein the encoder is shown in block diagram form in FIG. 7;

FIGS. 4A and 4B provide detailed schematic diagram of the I/O (input/output) buffer section of one embodiment of the invention wherein the I/O block diagram is shown in FIG. 8;

FIG. 5 is an illustration showing how the parts of FIGS. 1A-4B fit together; and FIG. 10 illustrates waveforms used in describing the inventive concept.

DETAILED DESCRIPTION

Before describing the circuitry in detail, it should be realized that the schematic represents circuitry for a multipurpose encoder for encoding data of various types under various conditions only one of which uses isochronous data sources and thus the detailed circuitry includes provisons for many other modes of operation. The block diagram will be described only in conjunction with the mode pertinent to the present invention.

Figure 6:
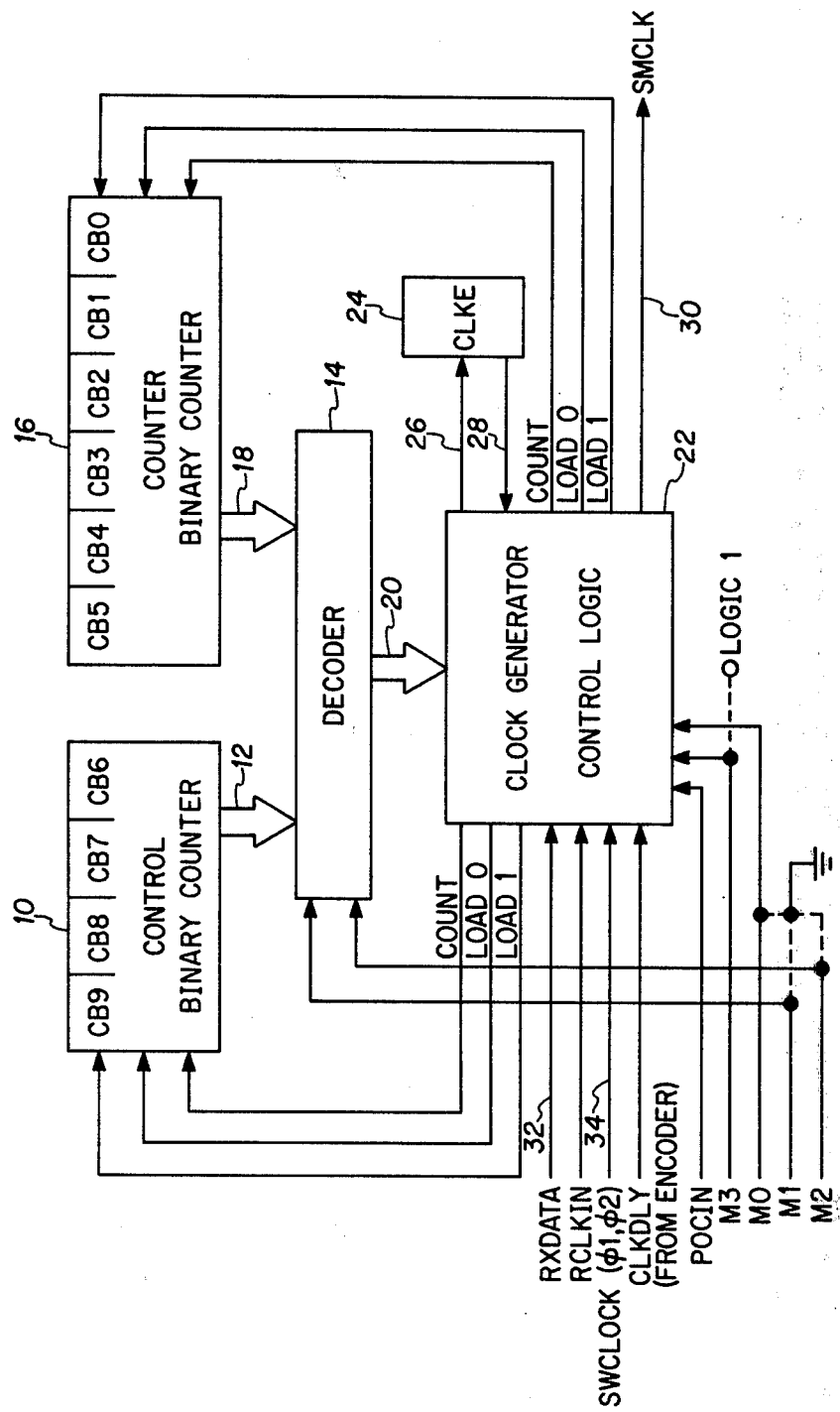

Starting first with FIG. 6, it will be noted that there is a control binary counter block 10 which provides a parallel output on a plurality of lines 12 to a decoder block 14. A counter binary counter block 16 provides outputs in a parallel fashion on a set of leads 18 to decoder 14 also. Block 16 provides bits 0 through 5 to the decoder while block 10 provides bits 6-9. A plurality of parallel leads 20 connects decoder 14 to a clock generator control logic block 22. A clock enable block 24 receives signals from block 22 on lead 26 and supplies signals to block 22 on lead 28. Control logic block 22 supplies signals labeled as load 0, load 1, and count on their respective leads to block 10 and provides the same information on similar leads to block 16. An output signal labeled as SMCLK which is an acronym for sample clock is provided on a lead 30. This sample clock is used to indicate the center of an incoming data signal so as to be sure of obtaining the correct logic level at the time of sampling for the encoder information. As illustrated, the control logic block also has input leads labeled M0, M1, M2, and M3. As shown by the dash lines for the mode of operation being described M0, M1, and M2 are all connected to a logic 1. In addition, the control logic has a receive data (RXDATA) lead 32, a pair of switch clock leads 34 and other leads which are merely labeled RCLKIN for Receive Clock In, CLKDLY for Clock Delay, and POCIN for Power On Clear Input. It will be noted that the switch clock lead pair 34 comprises of two leads, $\phi 1$ and $\phi 2$, since this particular device uses a two-phase clocking mechanism.

Referring now to FIGS. 1A-1D, it will be noted that various portions of the detailed schematic diagram are enclosed by dash lines and given a number identical to that used in FIG. 6. The upper portion of FIG. 1 which is not enclosed in dash lines comprises circuitry for power on clear and receive and drive clock synchronizing circuits. The remaining circuitry at the lower portion of FIG. 1B and all of FIG. 1D as well as the lower portion of FIG. 1C which is not enclosed in dash lines is circuitry used to produce the functions of the control logic block 22.

It should be noted that the specific connection of line M0 through M3 are for a modem synchronous data conversion mode with a 5 bit character length excluding the start and stop bits. If the M1 and M2 lines had been connected to a logic 1, the device would work with 8 bits and with other combinations of connections of ground and logic 1 to these two lines, the unit would work with 6 and 7 bits. However, for all future references to operation of this circuit, it will be with a 5 bit character length mode of operation excluding start and stop bits.

Figure 7:
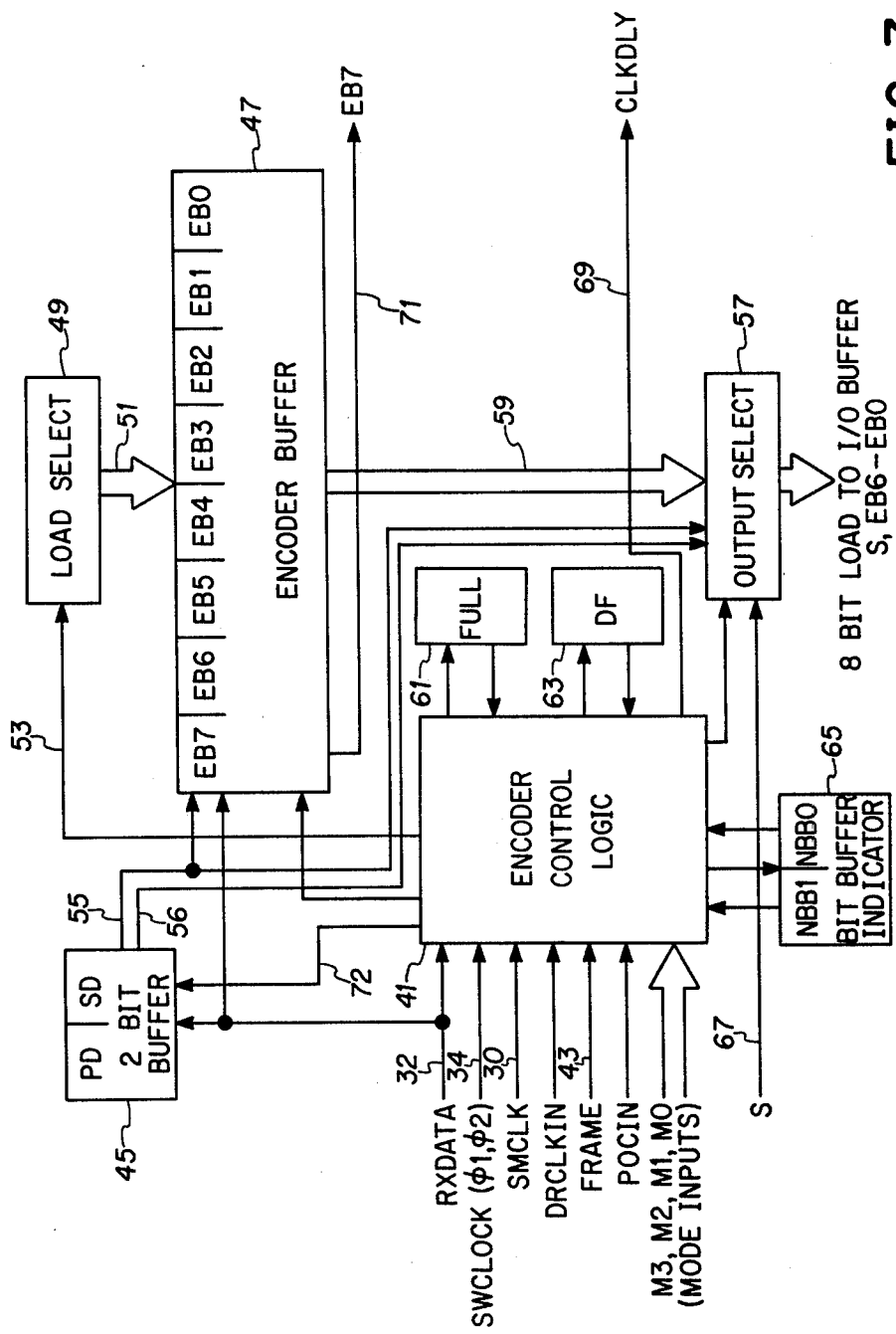

In FIG. 7, a plurality of leads including receive data 32 and switch clock 34 and sample clock 30 are illustrated being applied to an encoder control logic block 41. In addition, there are a drive clock in lead labeled DRCLKIN, a frame lead 43, a power on clear in lead labeled POCIN, and the mode inputs M0 through M3. Lead 32 is also connected to a 2-bit buffer 45 and to an encoder buffer 47. The buffer 45 has 2-bit positions which are labeled PD for Primary Bit and SD for Secondary Bit while buffer 47 has 8-bit positions. Only 5 of these bit positions (EB2 - EB6) are required for the presently described mode of operation. A load select block 49 supplies information to buffer 47 in parallel on a plurality of leads 51. The load select block receives data from encoder 41 on a lead 53. An output of 2-bit buffer 45 is supplied on a lead 55 to encoder buffer 47 while outputs on 55 and 56 are supplied to an output select block 57. Block 57 receives input data bits in parallel on a set of leads 59 from buffer 47. A "full" block 61 both receives and sends information from and to logic block 41 and is connected in a manner similar to a block 63 which is labeled DF. A buffer bit indicator 65 both sends and receives information to and from block 41. A lead 67 labeled S provides signals to output select block 57 which also receives signals from logic block 41. Logic block 41 has an output lead 69 which is labeled CLKDLY for Clock Delay. A further output of buffer 47 is shown on lead 71 as EB7. A lead 72 provides output signals from block 41 to buffer 45.

From observing FIGS. 3A through 3D, it will be apparent that the detailed schematic diagram has been treated in a manner similar to that of FIGS. 1A-1D in that dash lines are used to define areas of circuitry equivalent to the specific blocks in FIG. 7. These similar circuits are given identical numbers. The portions of the circuitry in FIGS. 3A and 3C which are not enclosed by dash lines comprise the circuitry for the encoder control logic 41 and the load select block 49.

Figure 8:
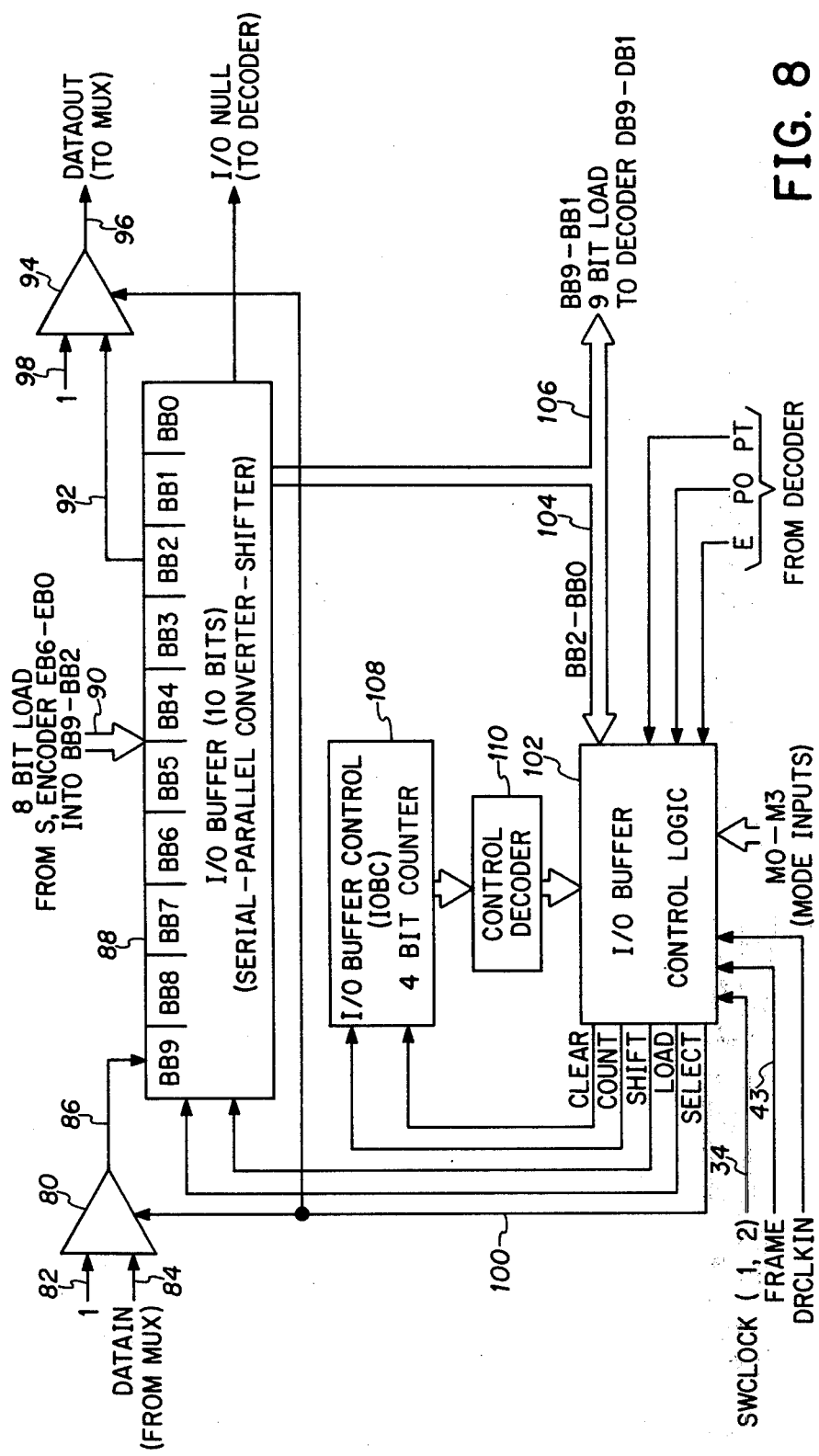

In FIG. 8, an input select block labeled 80 receives a logic 1 on a lead 82 and incoming data from a remote source or switch on a lead 84. The data is output on a lead 86 in a serial fashion to an in/out buffer 88 which during another time in the cycle of operation receives information in parallel on a plurality of leads 90. When data is being received on lead 86, data is also being serially output on a lead 92 and supplied to an output select block 94 which has a lead 96 providing output data to the switch or mux from which data is being received on 84. A lead 98 is connected to a logic 1. A select lead 100 is connected from a control logic block 102 to both of the blocks 80 and 94 when it is desired to pass information through these select blocks. The control logic block 102 has frame and switch clock inputs 43 and 34 as illustrated in FIG. 7 and also has the drive clock in as shown in FIG. 7. The input/output buffer 88 supplies signals indicative of the bits in bit positions 0 through 2 on a set of parallel leads 104 to control logic 102 and 9 bits (BB1 - BB9) on a plurality of leads 106 as an output to the decoder of FIG. 9. The decoder of FIG. 9 supplies return inputs labeled E, PO, and PT as illustrated. The control logic block 102 provides outputs labeled clear and count to an I/O control counter 108 and supplies leads labeled shift and load to the I/O buffer 88. An output of buffer control 108 is supplied on a set of parallel leads to a control decoder 110 which supplies outputs to the I/O buffer control logic block 102.

Figure 1A:
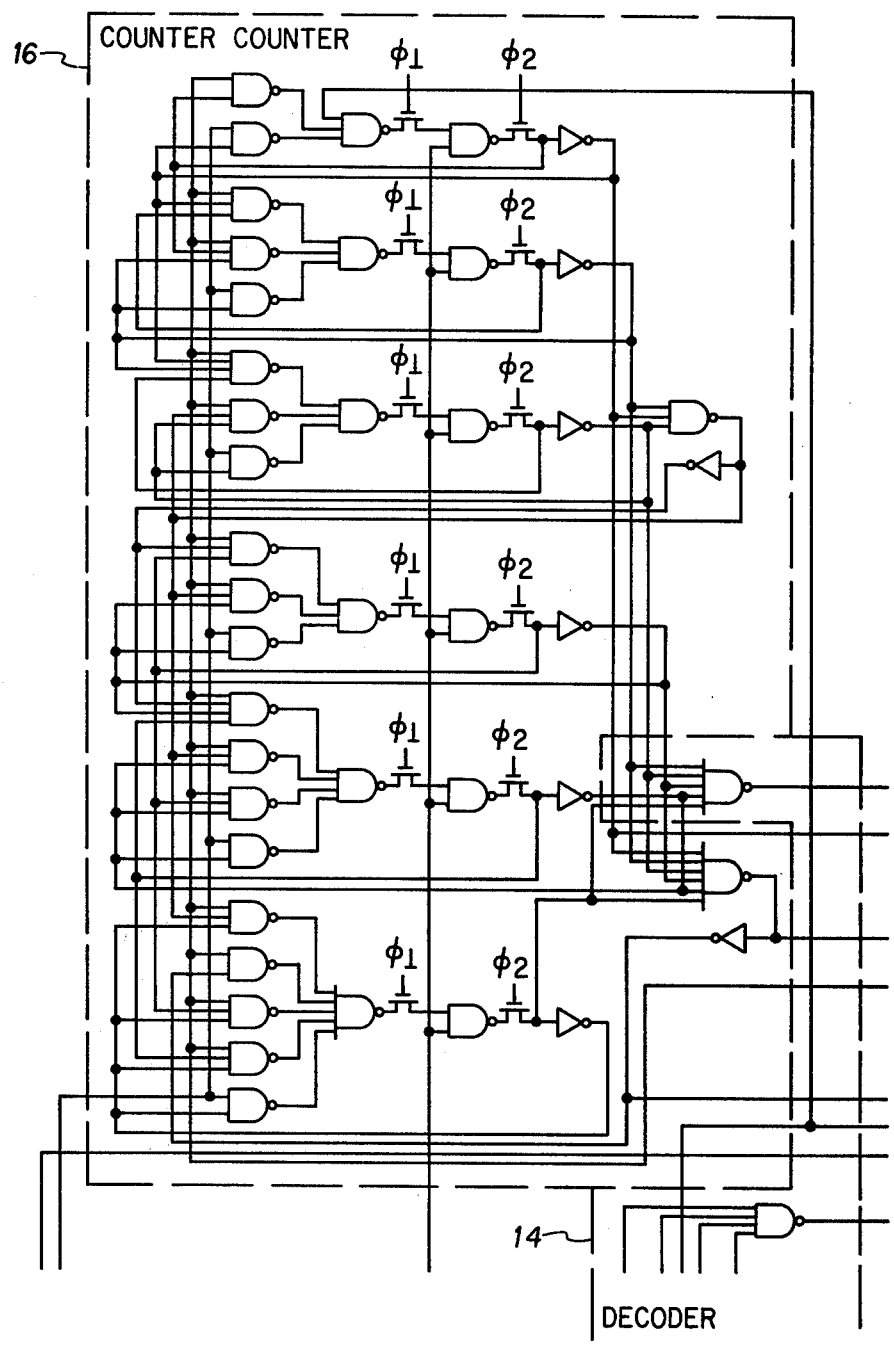
Figure 1B:
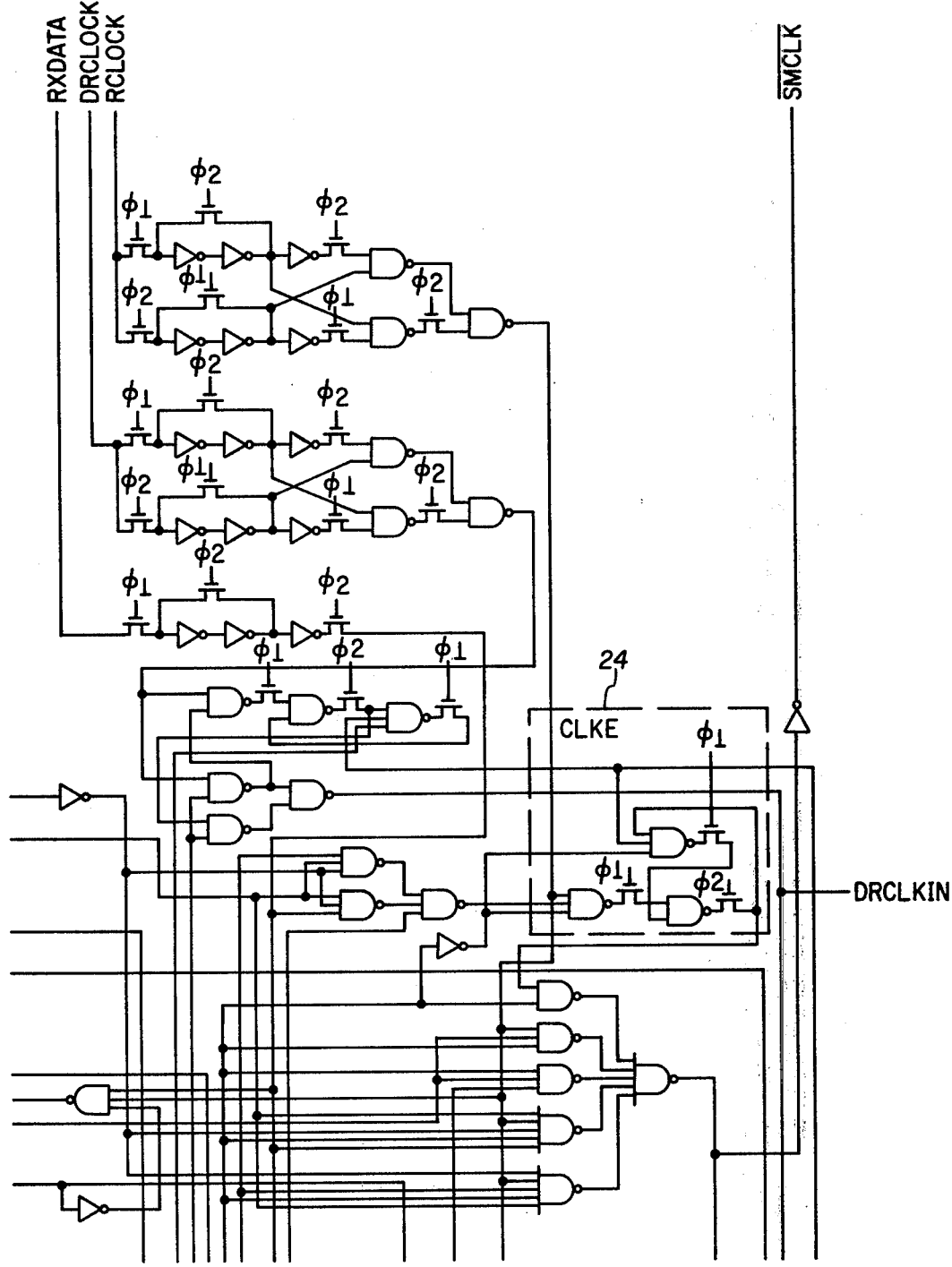
Figure 1C:
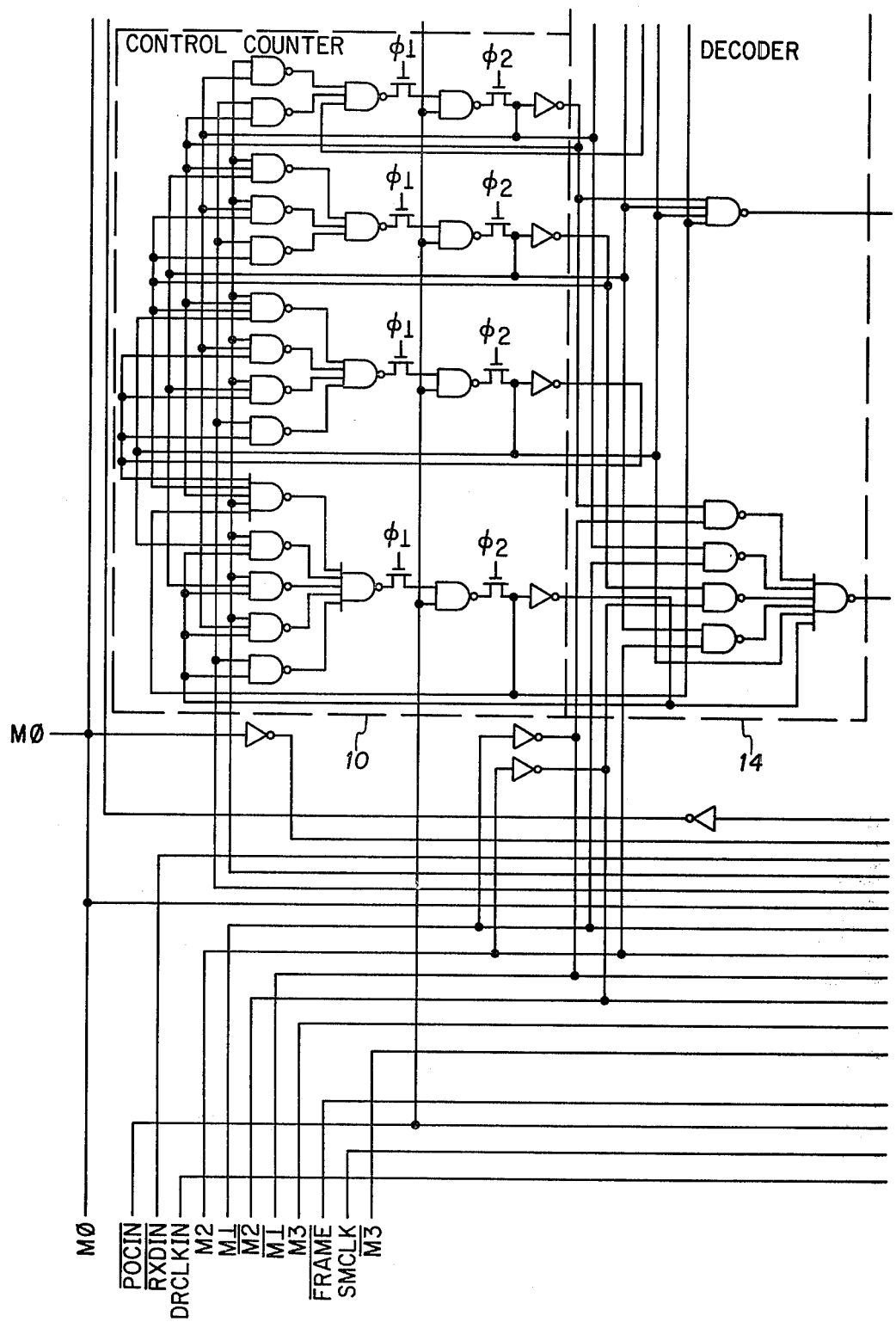
Figure 1D:
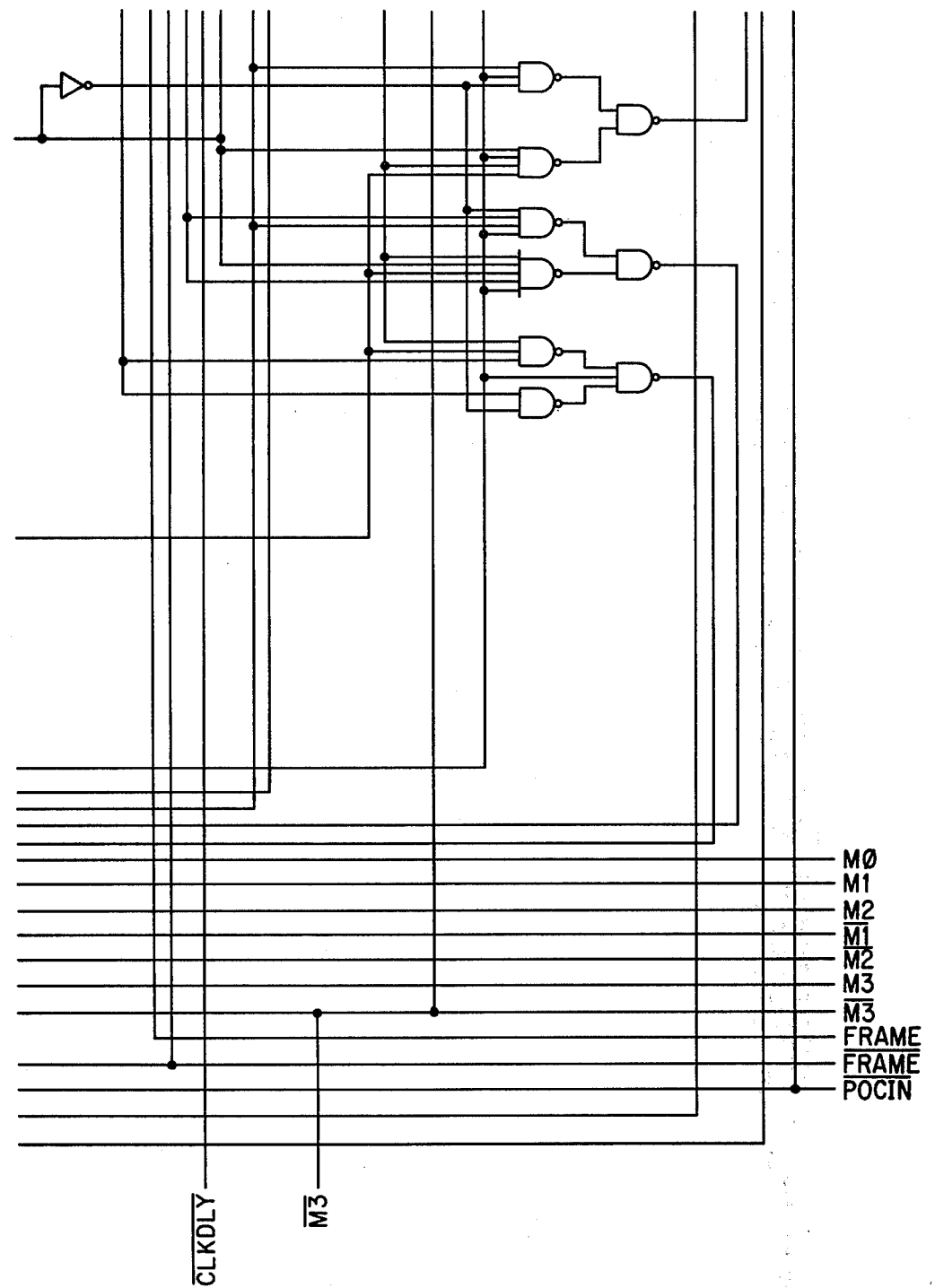
Figure 2A:
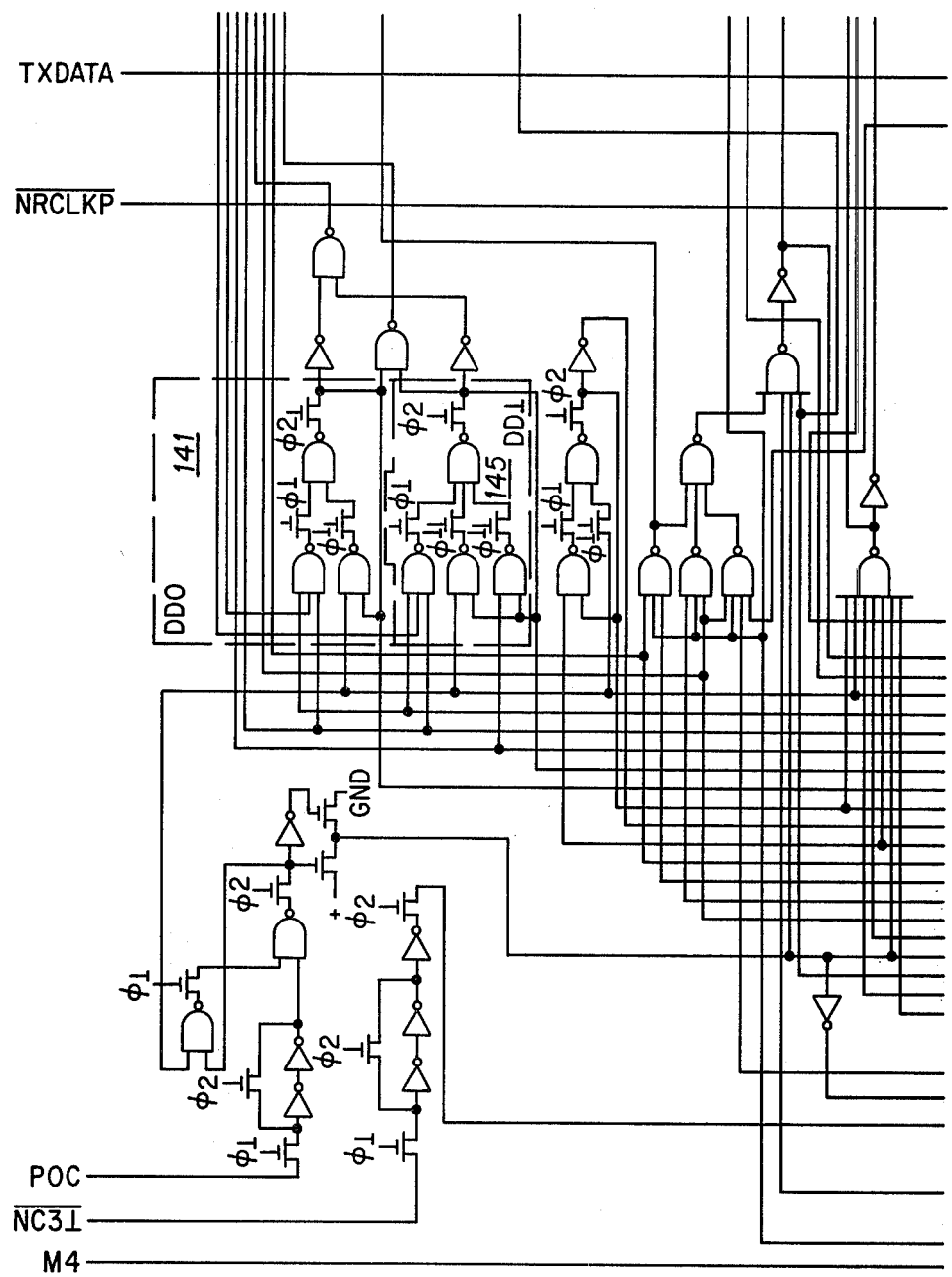
Figure 2B:
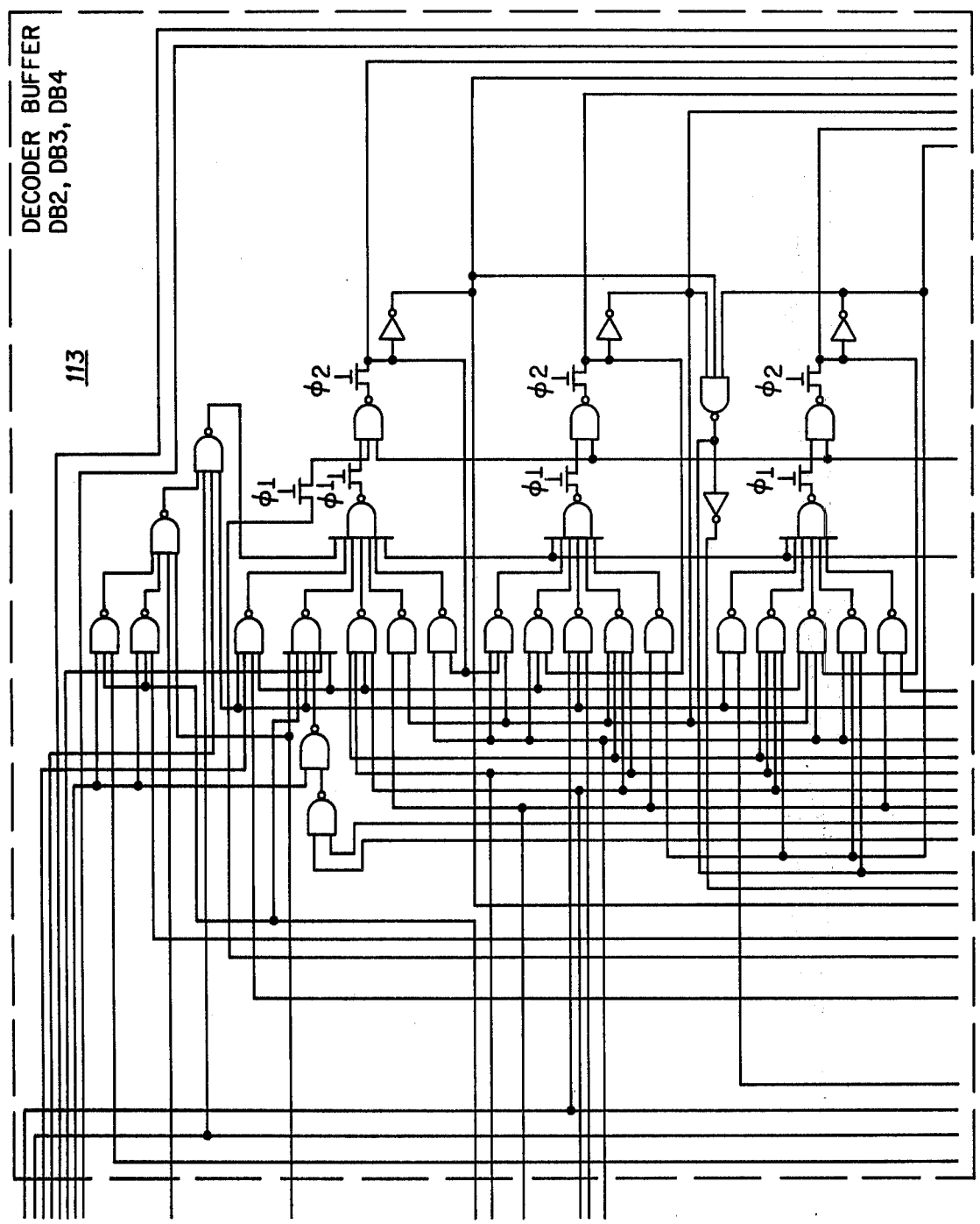
Figure 2C:
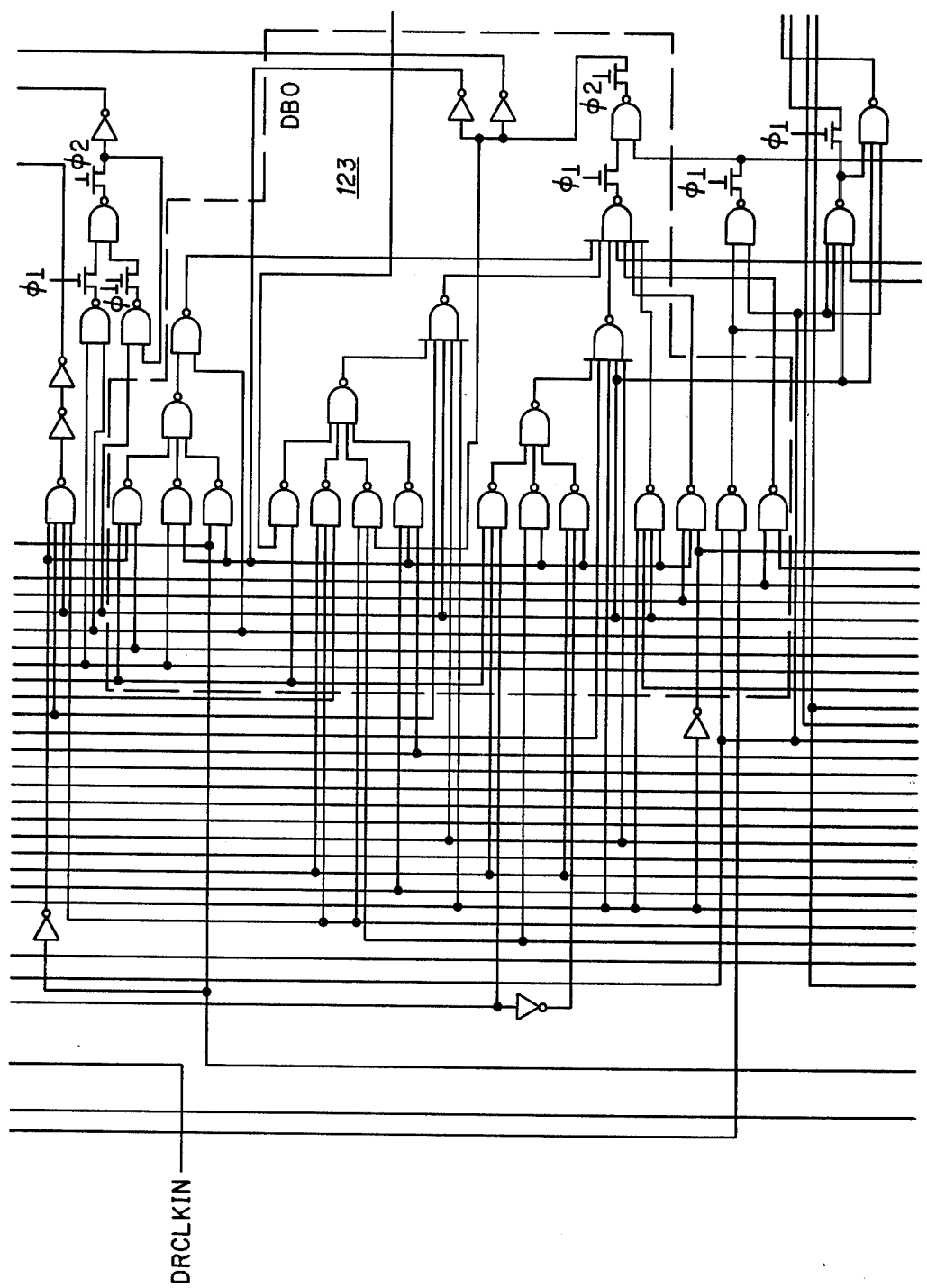
Figure 2D:
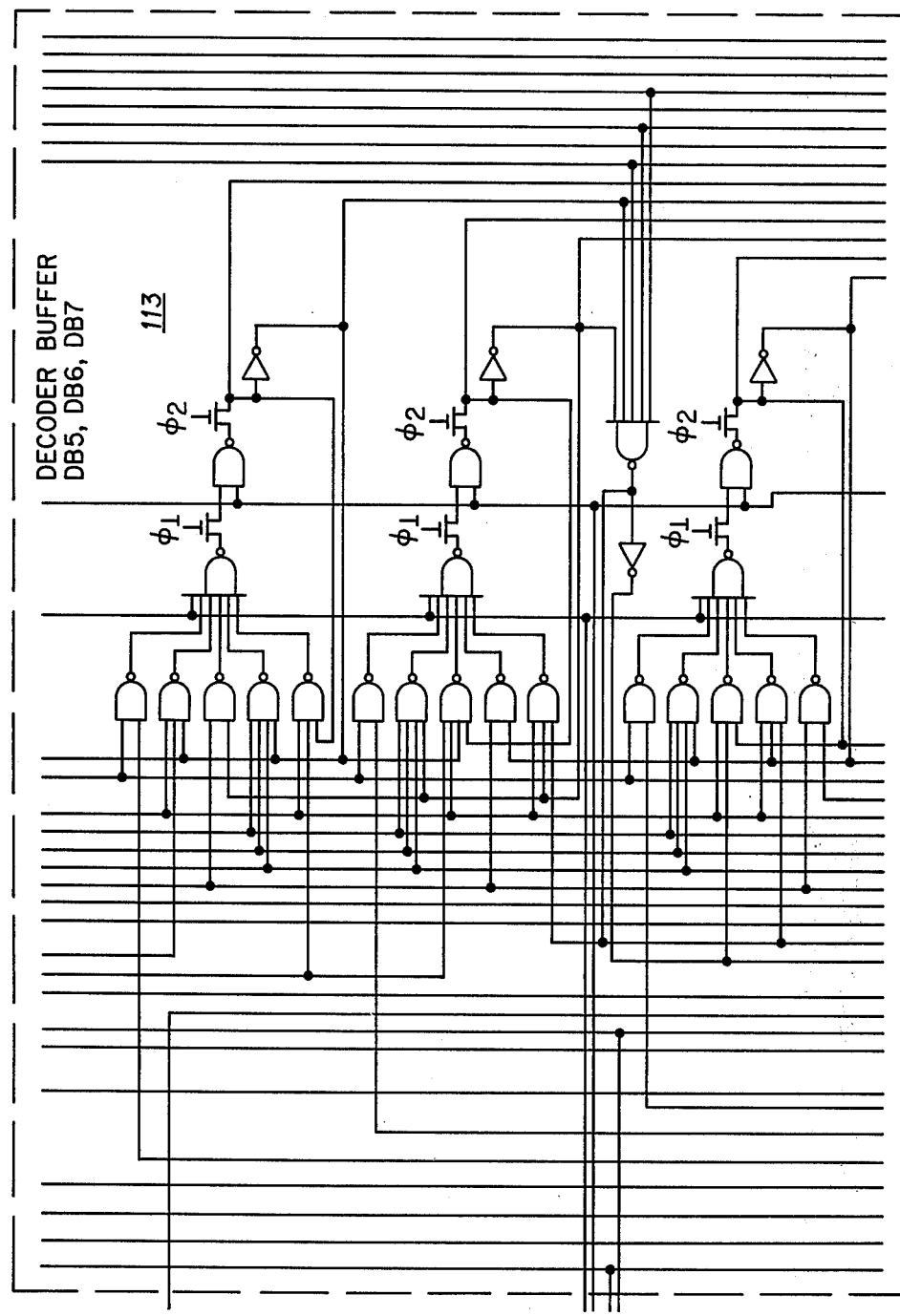
Figure 2E:
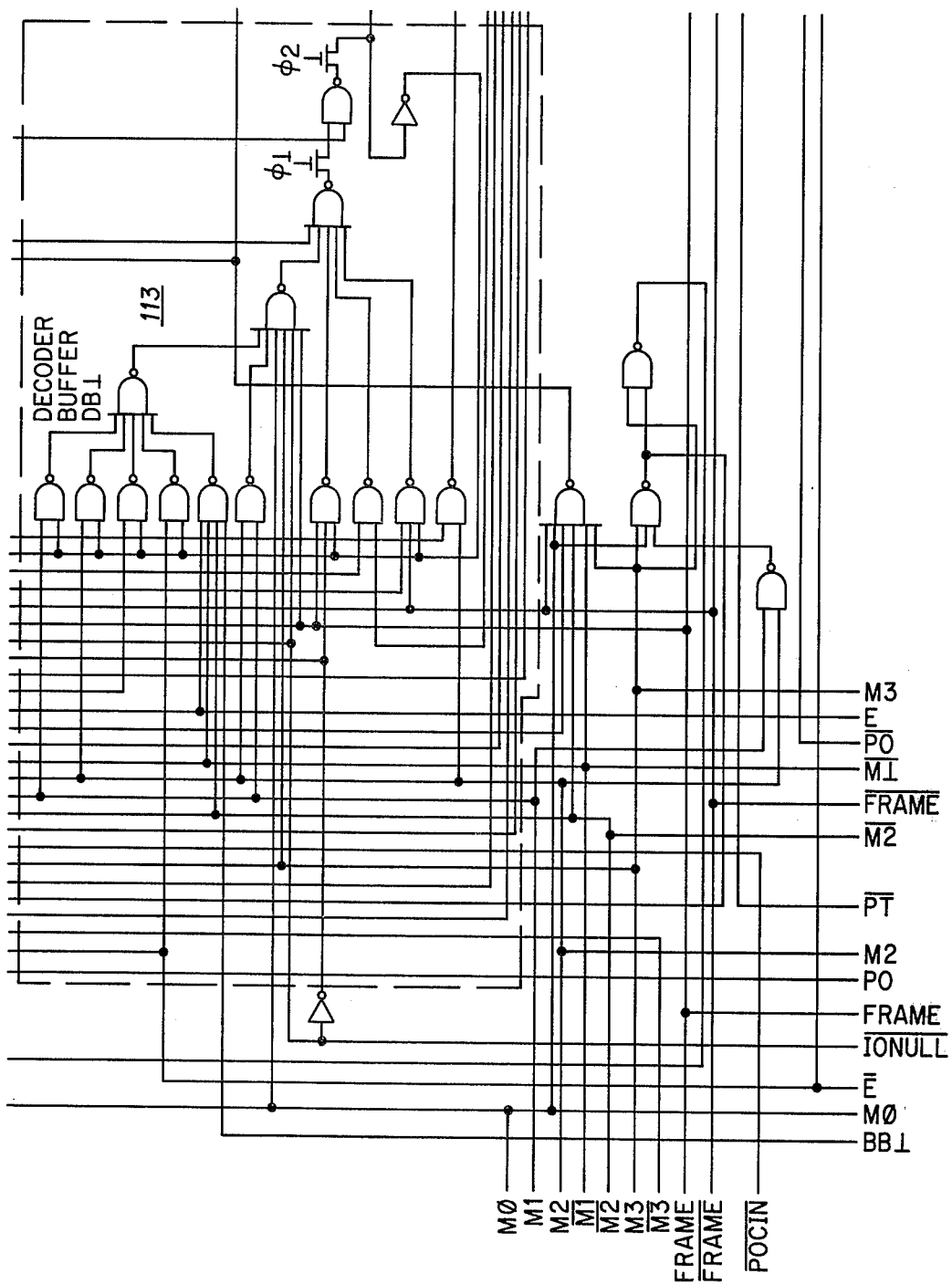
Figure 2F:
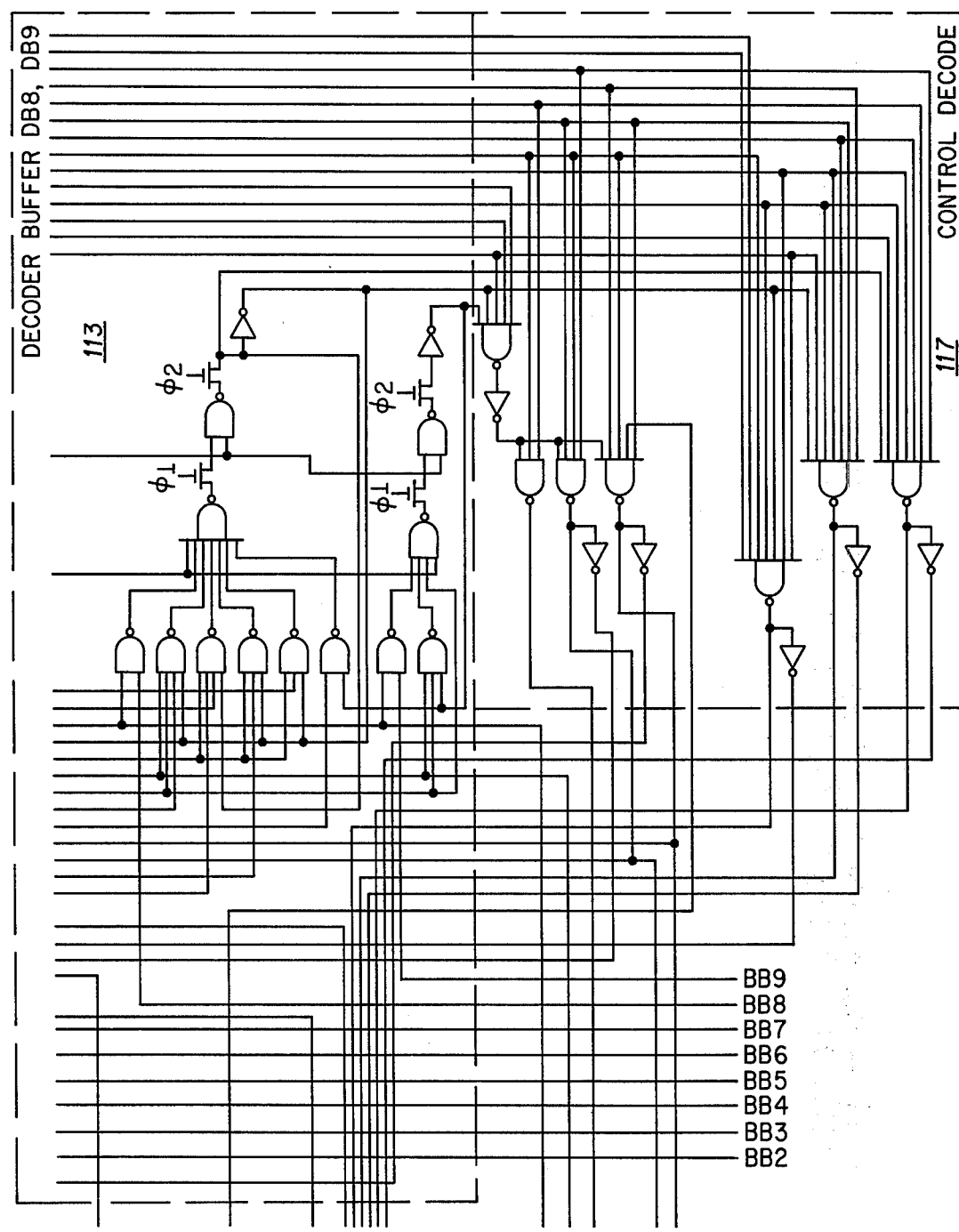
Figure 3A:
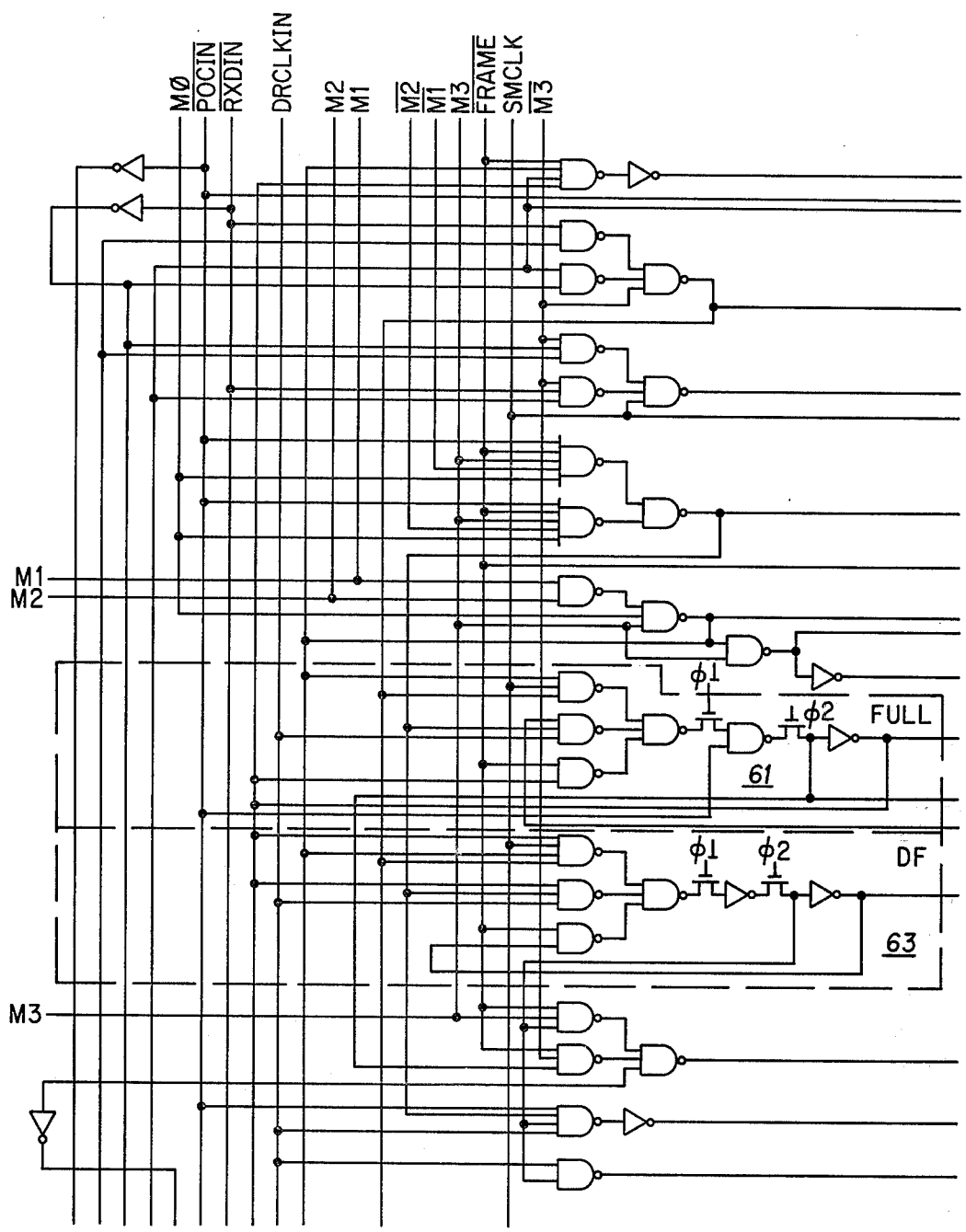
Figure 3B:
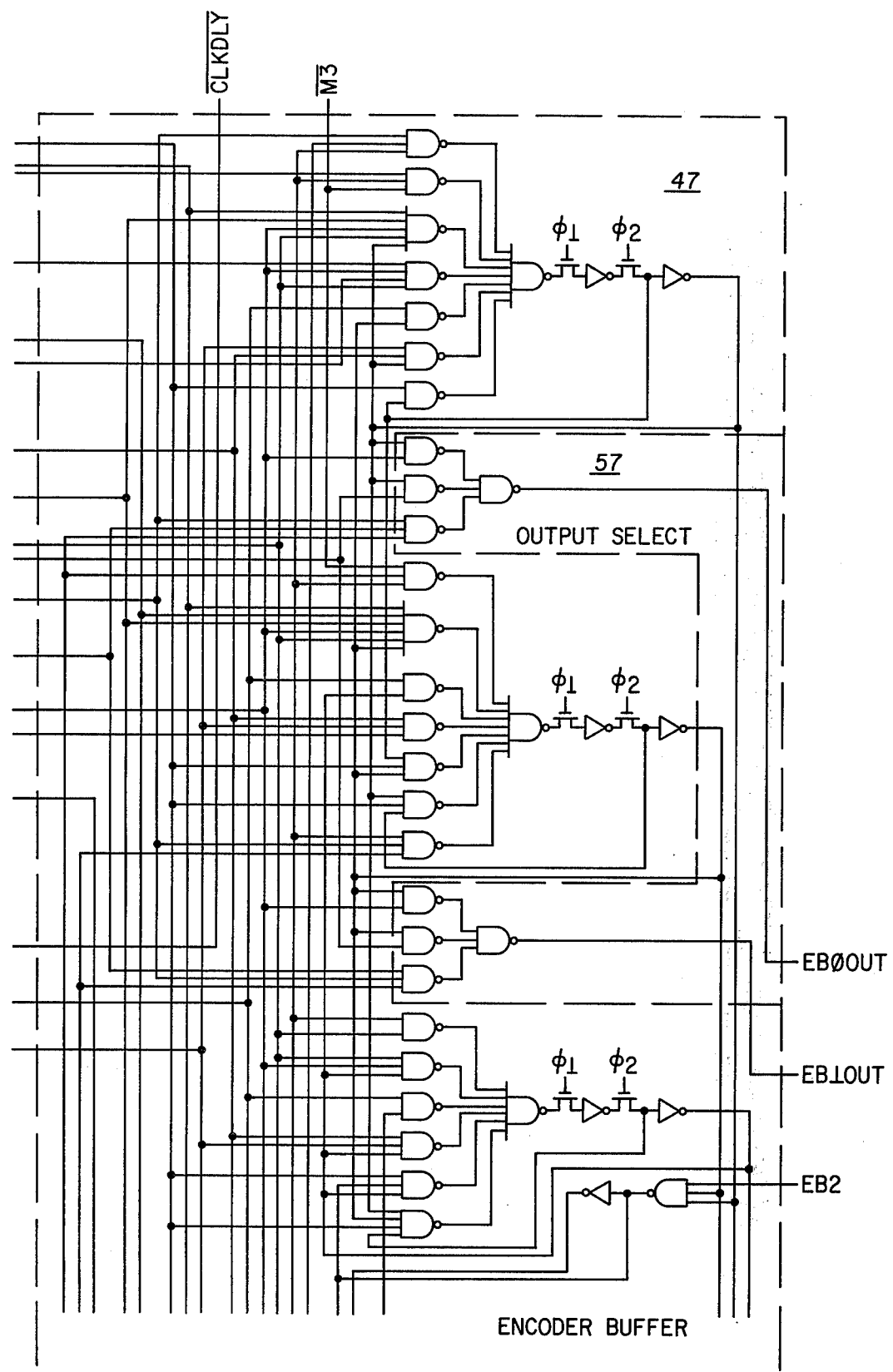
Figure 3C:
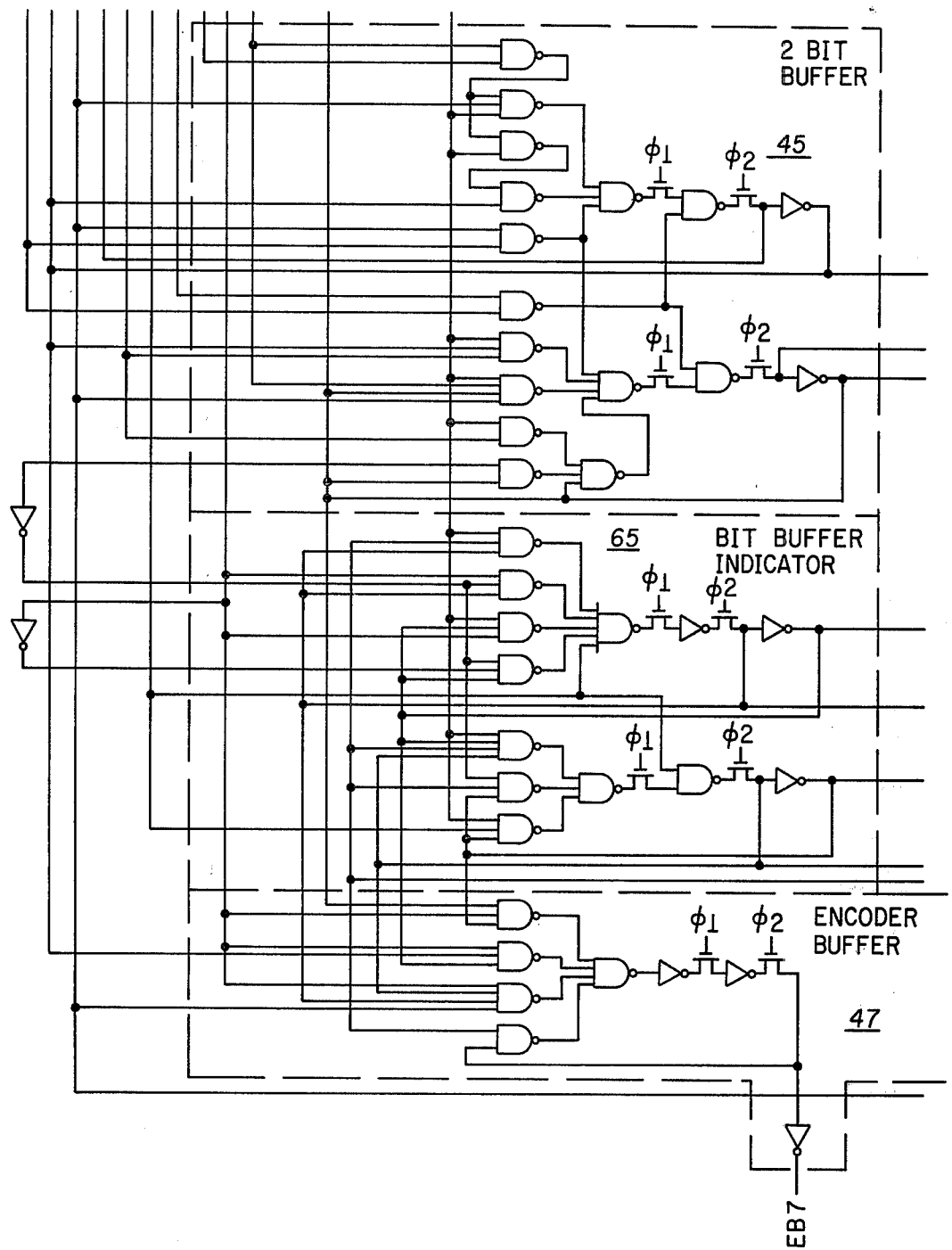
Figure 3D:
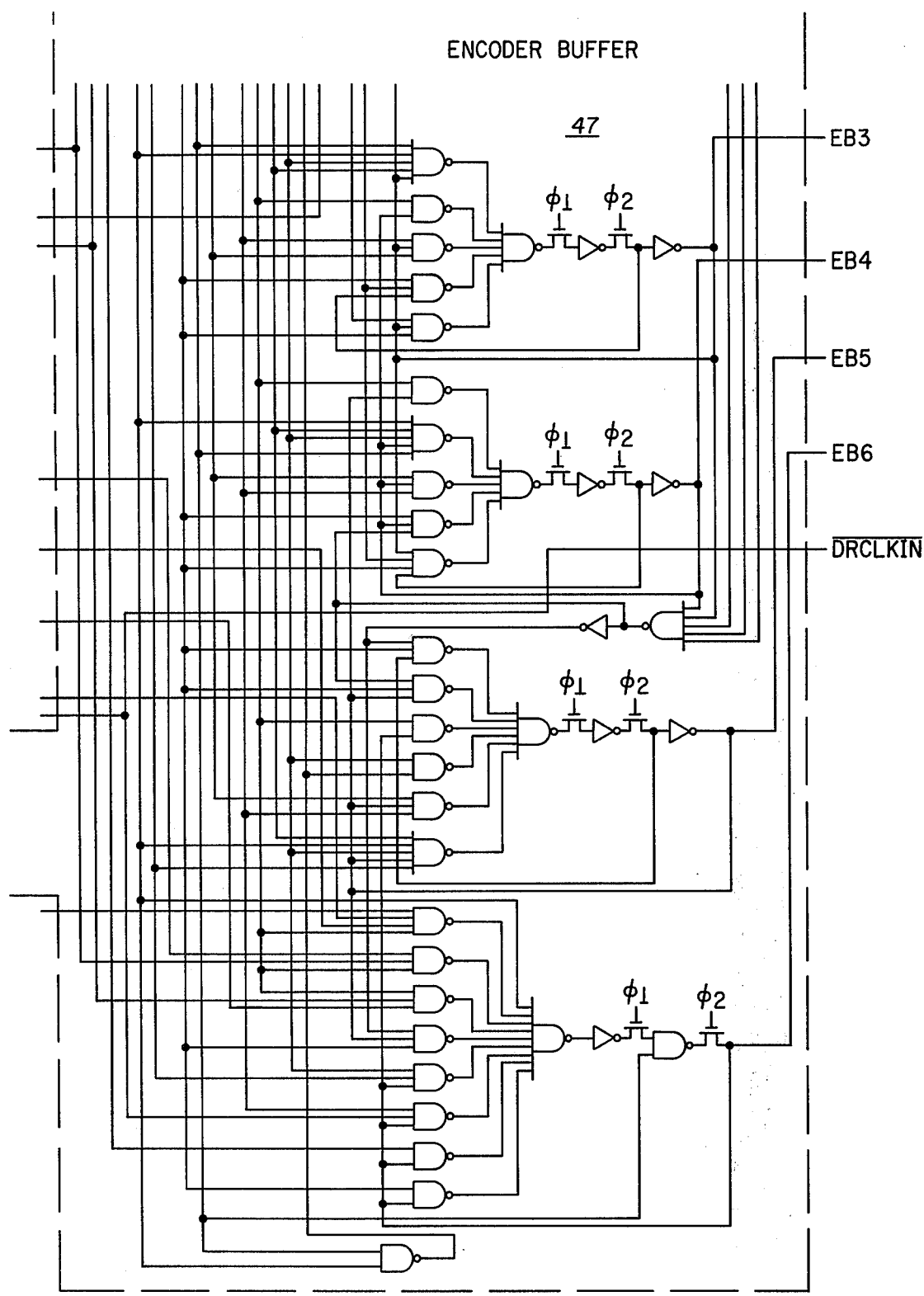
Figure 4B:
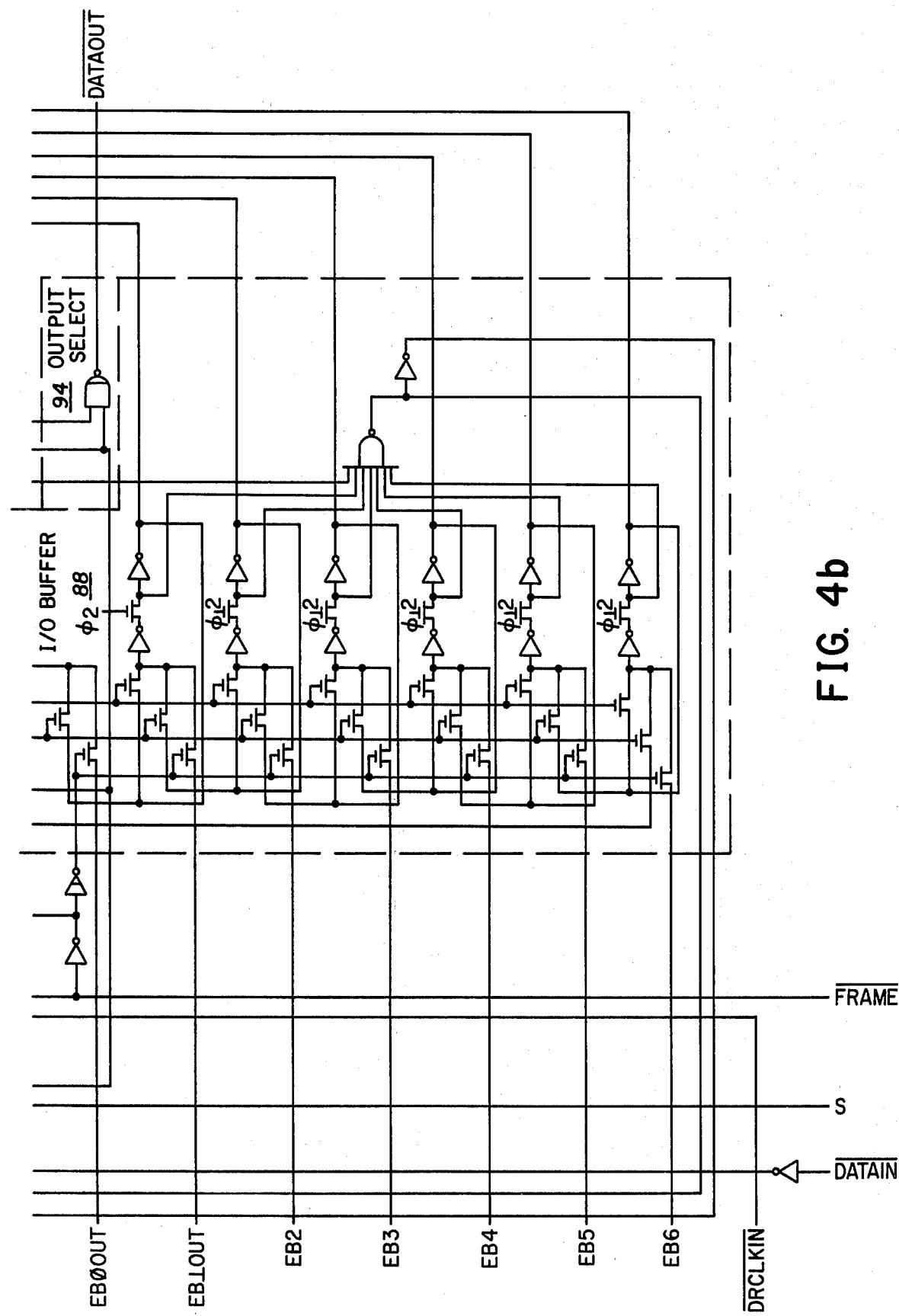
Figure 5:
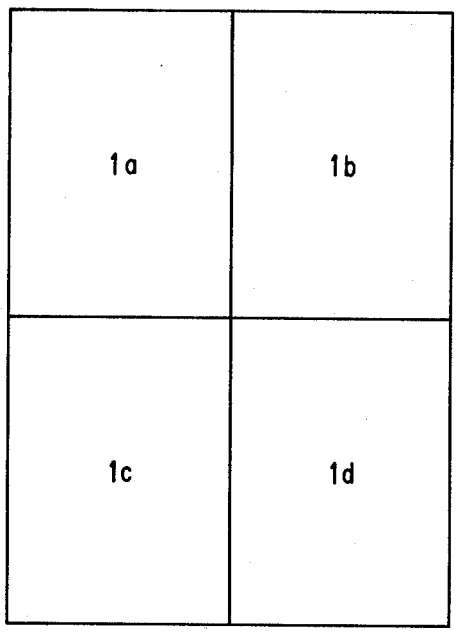
Figure 5:
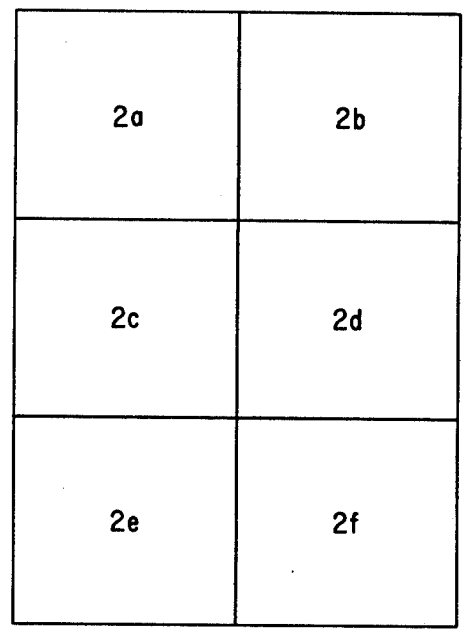
Figure 5:
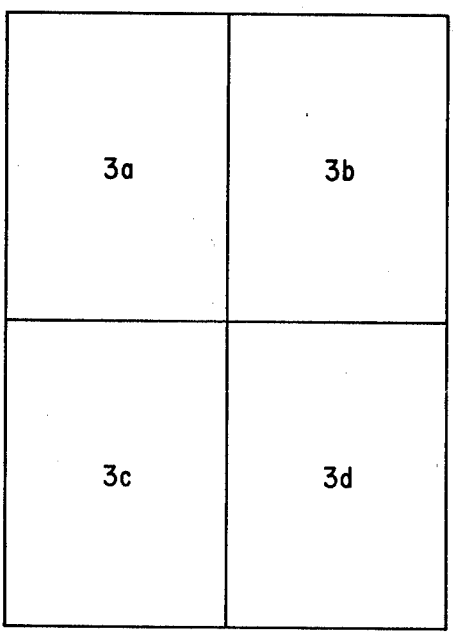
Figure 5:
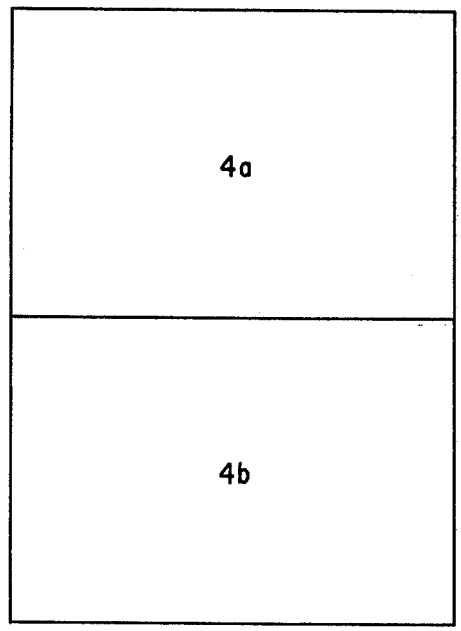

Referring now to FIGS. 4A and 4B, it will be noted that the enclosed dash line blocks having similar numbers to that in FIG. 8 perform identical functions. The circuitry which is not enclosed in dash line blocks provide the functions of the control logic 102 and the control decoder 110.

Figure 9:
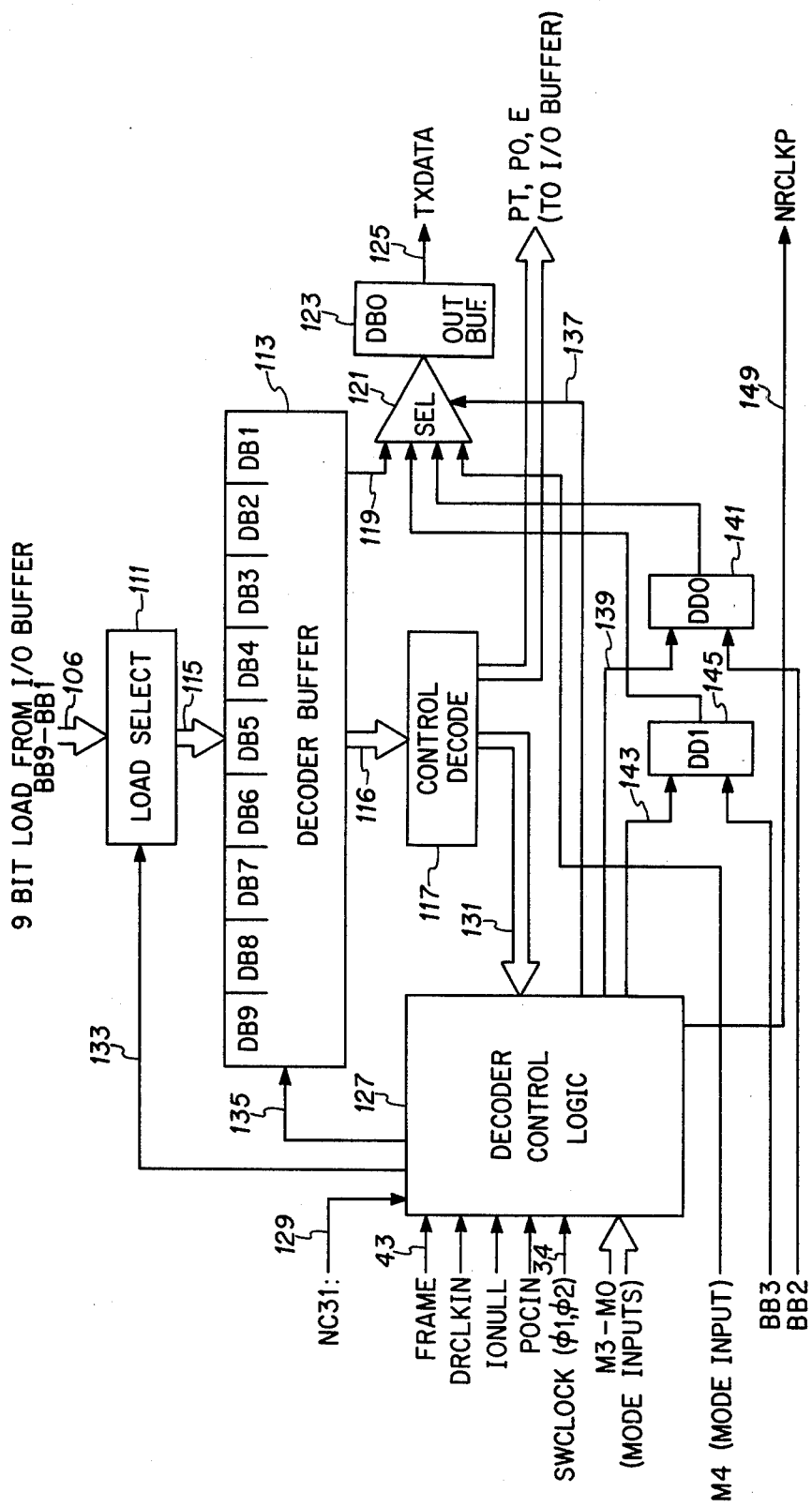

In FIG. 9, a load select block 111 receives a plurality of leads on the previously labeled bundle of wires 106 from I/O buffer as illustrated in FIG. 8. The load select block 111 provides signals to a decoder buffer 113 on a set of leads 115. The decoder buffer 113 provides a plurality of signals on a set of leads 116 to a control decode block 117. Decoder buffer 113 also provides signals on a lead 119 to a select block 121 whose output is provided to an output buffer also labeled of DB0 and given the designation as 123. DB0 123 provides output signals to be transmitted on lead 125. A decoder control logic block 127 receives a plurality of inputs including the frame input 43, the switch clock 34, and the mode inputs M0–M3. In addition, it receives an input on a lead 129 labeled as NC31 as well as a drive clock in, an I/O Null (input/output Null) lead and a POCIN lead (power on clear in). In addition, it receives a plurality of inputs from control decode 117 on a set of leads 131. Decoder logic block 127 provides an output on a lead 133 to load select block 111, an output on lead 135 to decoder buffer 113, an output on lead 137 to select block 121, an output on lead 139 to a block 141 labeled as DD0, and an output on lead 143 to a block 145 indicated as DD1. A final output is provided on a lead 149 which has a designation of NRCLKP which stands for Nominal Rate Clock Preset. It will be noted that block 145 has an additional input labeled BB3 while DD0 block 141 has a further input labeled BB2.

In FIGS. 2, similar portions are numbered identical to those in the decoder of FIG. 9. As will be noted, the decoder buffer 113 covers several pages wherein the portion on FIG. 2E is the detailed circuitry for the first bit position of decoder buffer 113. The circuitry shown in FIG. 2B covers bit positions 2 through 4, FIG. 2D covers bit positions 5, 6 and 7 while the portion shown in FIG. 2F covers bit positions 8 and 9. The circuitry which is not included within the dash lines covers the load selected block 111 and the control logic block 127 except for a small portion on the upper left hand portion of FIG. 2A which provides additional circuitry for the power on clear portion of the circuit in addition to that previously found in FIG. 1B.

Figure 10:
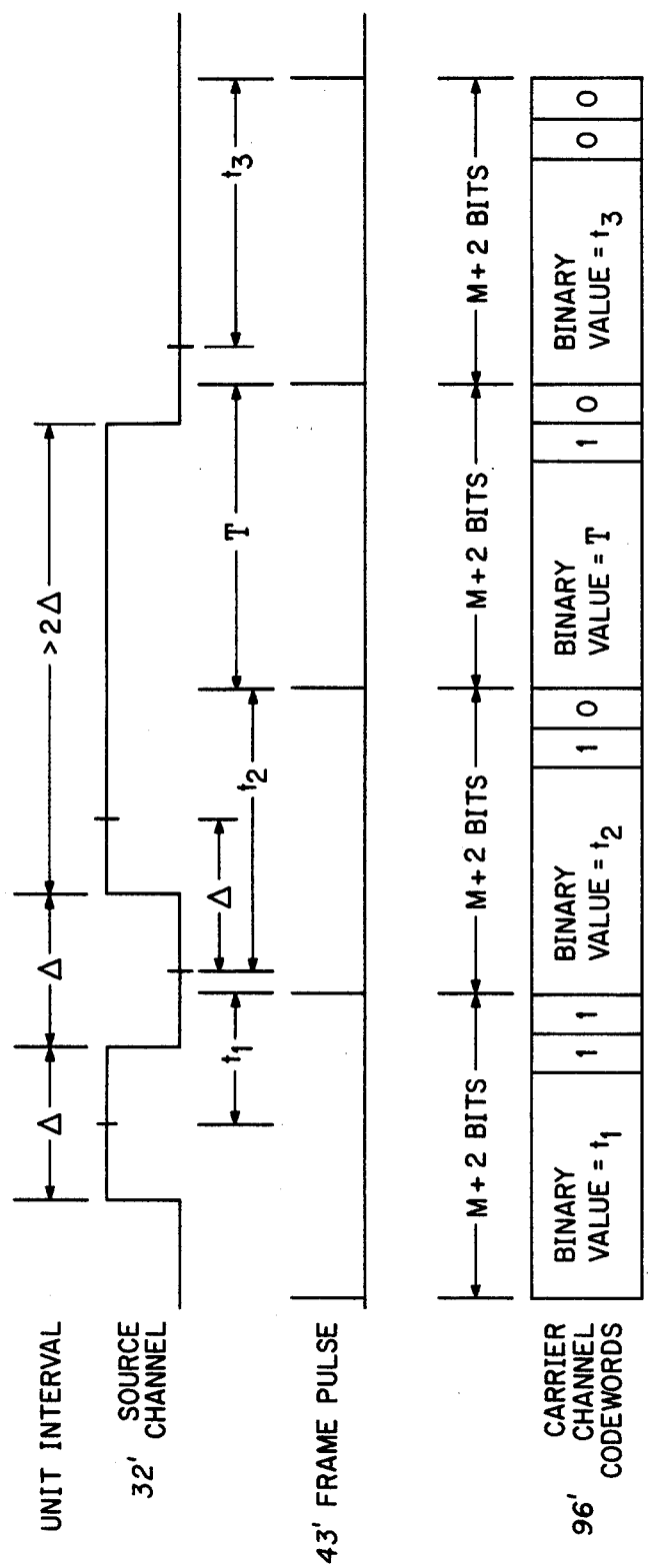

In FIG. 10, a unit interval is shown by the symbol Δ with the first and second time units being Δ and the third time unit being greater than 2Δ. The second line illustrates incoming data from the source channel such as 32' of the encoder block FIG. 7. The third line is indicative of the frame pulses such as input on line 43 to the encoder control logic block 41. The fourth line labeled as 96' is indicative of an output binary indication as provided on line 96 which would be used to indicate the transitions illustrated on line 32 with respect to the frame pulses on line 43.

OPERATION

Commencing with the sampling clock signal generator of FIG. 6 it may be noted that the counter 16 is capable of counting to 64 while the control counter 10 counts to 8 in the specific embodiment shown. As previously mentioned, the description of operation will be given for a 5-bit character excluding the start and stop bit. The start bit always is defined by the transition from an idle logic 1 to a logic 0 with the logic 0 lasting for 1 bit period and the stop bit is defined by the presence at the end of the character of a logic 1 condition extending over greater than a 1-frame time period. In the idle state with the input a logic 1, the clock generator control logic 22 awaits the transition from a logic 1 to a logic 0. When this condition is input on line 32, the counter 10 is actuated to change from a count of 0 to a count of 1 since in this embodiment a count of 0 defines an idle state. The counter 16 commences counting and if the input on 32 remains as a logic 1 for the first 32 counts out of 64 counts (64 counts is the time for one logic bit period) which occurs during a start bit period as shown for a unit interval in FIG. 10, the clock generator provides an output on lead 30 indicating to the encoder block of FIG. 7 that the logic level should be sampled for encoding purposes. This procedure, used only in conjunction with the start pulse, is indicative of a valid character or start pulse. As will be explained later in conjunction with FIG. 10, the last mentioned logic level sample would be the final bit in the channel code word of a frame wherein the entire code word first contains a binary value, then a first bit and a second bit where the first bit in time (in the code word) is actually a secondary bit (second bit sampled) and the second bit in time is defined as the primary bit (first bit sampled).

The sampling clock signal generator keeps track of the timing of a predetermined number of data bits in a character as defined by strapping operations, using the timing of the start bit, as described above, as the starting reference. As previously defined, it is set by the dash lines of FIG. 6 to have a 5-bit character. Thus, the control counter 10 checks every 64 counts and increments the binary counter 10 until the counter reaches 8 at which time it is reset to 0. As may be realized, it was set to a count of 2 upon reaching the center of the start pulse.

Continuing with FIG. 7 illustrating the encoder section of an embodiment incorporating this invention, it will be noted upon receiving a frame pulse on line 43 that the encoder control logic block 41 causes load select 49 to input a binary word into encoder buffer 47 which is indicative of the logic value at that time of the incoming data on lead 32 with the count from bits 2 through 6 being indicative of the time duration of a frame. Referring to FIG. 10, it will be noted that when there are no transition indicative samples during a frame, bits EB0 and EB1 of encoder buffer 47 are to be equated with the two logic values at the end of each frame such as the 3rd frame of 96'. The binary value portion of each code word is obtained from bits 2 through 6 in encoder buffer 47. When a sample clock pulse is received on line 30 indicating that a valid data bit has been received, the load select block 49 inserts a word in bit positions 2 through 6 indicative of a count of 1. The encoder buffer then continues counting until the end of a frame. At the end of a frame, the encoder logic 41 inserts the bits 2 through 6 into output select 57. The receipt of a pulse on line 30 also activates full block 61 as well as activating the 2-bit buffer 45 on lead 72. The first activation inserts the logic level found on lead 32 for the primary data bit (PD in block 45) which is equivalent to bit position EB0. If there is a second transition during the frame, this is noted by block 63 and the encoder activates line 72 to accept the logic value of the line 32 in the secondary bit position (SD) equivalent to bit position EB1. If a third transition is received during that same frame, an error condition results since by definition the device will not operate if the incoming bit period is less than half of the length of a carrier channel code word, or in other words, the frame time. Thus, if there is no transition, the output select 57 is loaded with only the bits from encoder buffer 47 (since it is initially loaded with a predetermined number based on the logic level of the last frame before being reset to a count of 1) but if there is one or two transitions, the bits from bit positions 2 through 6 in encoder buffer 47 along with the value of an eighth or S bit are loaded into output select 57 while the 2-bit positions from block 45 are loaded in the remaining 2-bit positions. Note that the S bit is a signalling bit and is not used by the encoder in the application of this device to isochronous data encoding as herein presented.

The data from block 57 is loaded into the I/O buffer 88 of FIG. 8. These bits are loaded into bit positions 2-9 in buffer 88 as indicated. The buffer 88 is then actuated by the shift input lead from block 102 so as to commence shifting the bits out to the line or switch or whatever load is connected to 96 on a serial basis. Simultaneously, input bits from the switch to be decoded are passed through the input select block 80 and into the buffer 88 commencing with bit position BB9. When the encoded word has been completely shifted out and the new word completely shifted in, the I/O buffer control logic block 102 actuates the load lead and outputs the information from buffer 88 onto lines 104 and 106 while simultaneously receiving a new encoded word from encoder buffer 47 of FIG. 7.

As mentioned previously, the decoder of FIG. 9 operates in the reverse manner from the encoder of FIG. 7 in that it receives the 8-bit of a possible 9-bit load from I/O buffer 88 and the word is decoded by control decode 117. If the binary word or number in bit positions 4-8 is indicative of the maximum frame length, the unit determines that there have been no transition indicative samples and thus merely continues the output signal at the previous logic level on lead 125. If, however, the number is less than the maximum, it begins counting upward from the input number until the maximum is reached. At this time, the output is set to the logic level indicated by the bit in bit position 1. If this setting occurs near the beginning of a frame, it is possible for a second data bit to occur and the control logic 127 uses this prescribed unit interval time as defined in FIG. 10 to count the amount of time to a second setting. A data bit indication is output on lead 125 at this time.

Utilizing the above information in conjunction with FIG. 10, it will be realized that if the incoming data on line 32 provides a start transition, this will activate the clock generator so that exactly at the middle of data bits sample pulses wll be provided on line 30 to activate the encoder of FIG. 7 no more than once per frame to commence counting. This count, as illustrated in FIG. 10, would be the count T1. The T1 value would appear in line 96' as binary value T1. The logic level after the sample pulse is a logic 1 and this is indicated in bit position 0. The logic level at the last sample of the frame was a logic 1 and this is indicated in bit position 1. Going to the next or second frame, it will be noted that the sample pulse indicative of the data bit transition occurs soon after the commencement of this frame. Thus, the counter in FIG. 7 commences counting the value of T2 which is inserted in the second carrier channel code word. The logic level of the received data line 32 at the time of the sample pulse is a logic 0 and this is indicated in bit position 0, but at the end of the frame the last sampled logic level was logic 1 and this is inserted in bit position 1.

It may be assumed that the period designated as greater than 2 unit intervals or 2Δ is the stop pulse and this fact may be noted by the clock generator so that further sample pulses are not provided. Since no sample pulse is received by the encoder of FIG. 7, the number which is initially inserted into buffer 47 remains there and provides a value T indicative of the maximum frame count and the value of logic 1 in the first bit position indicating the logic level at the end of the frame. The bit position 0 indicates a logic 0. While this may seem somewhat inconsistent since it was logic 1 during the entire frame, the indication of identical bits in the PD and SD (Primary and Secondary) bit positions combined with a maximum frame count T complicated logic design and was designated by definition as an error condition. The source channel as illustrated does drop to a logic 0 prior to the end of the third frame but a sample pulse is not received by the encoder during this time. However, a sample pulse is received part-way into the fourth frame and the encoder of FIG. 7 produces a binary value in the fourth code word equivalent to T3 with the logic level of 0 being indicative for both sample clock pulses occurring within this frame.

While there are many leads and some bit positions in various buffers that have not been described, this is due to the fact that the circuitry illustrated was used to provide data transmission of both asynchronous, modem synchronous, and network synchronous data under conditions of regenerative clock, nonregenerative clock, and external clock. Further, these various types of data occurred with character lengths of 5, 6, 7 and 8 bits. Thus, the circuitry is very flexible and considerable time and effort would be needed to excise only the portions applicable to the present inventive concept. Therefore, these parts have been included in the drawings and excluded from the present description of operation.

While a single embodiment or method of operation of this invention has been provided, it will be realized that many modifications can be utilized and still fall within the scope of the invention. As an example, although the counting is illustrated as being from the transition to the end of a frame, the counting could just as easily occur from the beginning of a frame to the first transition as the binary value within the carrier channel code word. Further logic bit indicative of the logic level of the incoming data bit stream at the end of the frame could instead be used to record the logic level at the beginning of the frame with appropriate changes in the decoding mechanism.

In view of the above, I wish to be limited only by the scope of the invention as defined in the attached claims.

What is claimed is:

1. The method of encoding transitions of isochronous data comprising the steps of:
   generating frame pulses to define a period of time designated as a frame;
   generating data bit sample pulses;
   generating a digital number indicative of the time difference, if any, between the occurrence of a frame pulse and the first occurrence of a sample pulse in a frame;
   storing a digital indication of the difference obtained;
   storing a digital indication of the polarity of the isochronous data at the time of occurrence of the first data bit sample pulse in each frame;
   storing a digital indication of the polarity of the isochronous data at the end of each frame; and
   outputting an encoded word indicative of the stored digital indication once for each frame pulse.

2. Apparatus for encoding transitions of isochronous data comprising in combination:
   means for providing frame pulses defining a period of time designated a "frame";
   means for generating data bit sample pulses indicative of sampling times of incoming isochronous data;
   means for generating a digital number indicative of the time difference, if any, between the occurrence of a frame pulse and the first occurrence of a sample pulse in a frame;

means for storing a digital data bit indication of the difference obtained;

means for storing a digital data bit indication of the polarity of the isochronous data at the time of occurrence of the first data sample pulse in each frame;

means for storing a digital data bit indication of the polarity of the isochronous data at the end of each frame; and means for outputting an encoded word indicative of the stored data bits once for each frame pulse.

3. The method of digitally encoding binary data comprising the steps of:

detecting the occurrence of a start bit in a string of data bits comprising a digital word wherein data bits in said string occur at a predetermined frequency rate;

sampling the logic level of each data bit in the word;

generating a periodically occurring framing pulse the frequency rate of which is more than half the frequency of occurrence of said data bits wherein two consecutive pulses define a "frame period";

timing the interval between a framing pulse and the first indication of occurrence of a data bit sample occurring in a frame period; and generating an output digital word including an indication of said interval, an indication of data bit logic level signal immediately after a sample and an indication of the data bit logic signal substantially simultaneous with a framing pulse.

4. Apparatus for digitally encoding binary data comprising in combination:

first means for supplying a stream of data bits comprising a series of words each including a start bit, a stop bit and intermediate information bits wherein the data bits in a given word occur at a given frequency rate;

second means, connected to said first means, for detecting the occurrence of a start bit and providing a predetermined number of first pulses;

third means for sampling the logic level of each data bit provided by said first means at times in accordance with said first pulses;

fourth means for providing a periodically occurring framing pulse the frequency rate of which is less than half the frequency of occurrence of said data bits wherein two consecutive pulses define a "frame period";

fifth means, connected to said fourth means, for timing the interval between a framing pulse and the first indication of occurrence of a data bit sample occurring in a frame period; and sixth means, connected to said third and fifth means, for generating an output digital word including an indication of said interval, an indication of data bit logic level signal immediately after a transition and an indication of the data bit logic signal substantially simultaneous with a framing pulse.

5. The method of encoding a binary level isochronous data bit stream having a data bit rate of n/sec comprising the steps of:

generating periodically occurring frame pulses the frequency rate of which is at least as high as (n/2)/sec and one cycle of which comprises a frame period;

sampling the logic level of the data bits; and generating an output digital word each frame period including an indication of the interval between a frame pulse and a data bit sample time, if any, occurring during a frame period, an indication of the logic level of the bit stream immediately after a transition and an indication of the logic level of the bit stream substantially coincident with the occurrence of a frame pulse.

6. Apparatus for encoding a binary level isochronous data bit stream having a data bit rate of n/sec comprising in combination:

first means for providing periodically occurring frame pulses the frequency of which is at least as high as (n/2)/sec and one cycle of which comprises a frame period;

second means for sampling the logic level of the data bits; and third means, connected to said first means, for generating an output digital word each frame period including an indication of the interval between a frame pulse and a first data bit sample time, if any, occurring during a frame period, an indication of the logic level of the bit stream at the sample time, and an indication of the logic level of the bit stream at a second occurrence of a data bit sample time in a frame period.

7. The method of decoding a continuous stream of received digital words having a time indicative first portion, a logic value indicative second portion, and a logic value indicative third portion to form an isochronous output data stream of predetermined bit periods comprising the steps of:

generating a periodically occurring series of framing pulses defining the boundaries of frame periods;

changing the logic level of an output signal, when a first portion of a received digital word is less than a given value, at a time indicative of the value of the first portion of the word to a logic value indicative of a second portion of said word; and changing the logic level of the output signal one bit period after the first change in a frame period when so indicated by a third portion of the received digital word.

8. Apparatus for decoding a continuous stream of received digital words, each having at least three portions, to form an isochronous output data stream of predetermined bit periods comprising in combination:

means for providing a periodically occurring series of framing pulses which pulses define the boundaries of frame periods;

means for changing the logic level of an output signal when the first portion of a received digital word is less than a given value at a time indicative of the value of the first portion of the word to a logic value indicative of the second portion of said word; and means for changing the logic level of the output signal one bit period after the first change in a frame period when so indicated by the third portion of the received digital word.

9. A system for transmitting isochronous data by encoding the data at the transmitting end to form a periodically recurring stream of data bits wherein the period of recurrence defines a frame and decoding the stream at a receiving end to generate a replica of the original isochronous data stream comprising, in combination:

first means for supplying isochronous data bits of information;

sample means connected to said first means for sampling the logic level of the data bits;

second means, connected to said first means, for encoding the isochronous data bits in the form of digital words a first portion of which is indicative of whether or not a data bit sample time has occurred in the incoming isochronous data stream during a given frame period and if so where during the frame period the first sample time therein has occurred, a second portion of which is indicative of the logic level of the isochronous data at the first sample time and a third portion of which is indicative of the logic level of the isochronous data at a second sample time occurring in the frame period;

third means, connected to said second means, for transmitting the digital words;

fourth means connected for receiving the digital words; and fifth means, connected to said fourth means, for decoding the received digital words and recreating an isochronous data stream in accordance with the value provided in the three portions of the digital words.

* * * * *

UNITED STATES PATENT AND TRADEMARK OFFICE
CERTIFICATE OF CORRECTION

PATENT NO. : 4,136,258
DATED : January 23, 1979
INVENTOR(S) : Harold W. Workman

It is certified that error appears in the above-identified patent and that said Letters Patent are hereby corrected as shown below:

Column 2, line 18, delete "2/M+2)" and substitute therefor --2/(M+2)--.

line 23, delete "$\geq$" and substitute therefor --$\geq$--.

Column 9, line 5, after "data" insert --bit--.

Column 12, line 10, delete "value" and substitute therefor --values--.

Signed and Sealed this

Twenty-fifth Day of September 1979

[SEAL]

Attest:

Attesting Officer

LUTRELLE F. PARKER
Acting Commissioner of Patents and Trademarks